United States Patent
Bitan et al.

(10) Patent No.: US 12,016,353 B2
(45) Date of Patent: Jun. 25, 2024

(54) COMPOSITIONS AND METHODS FOR AQUACULTURING

(71) Applicants: The State of Israel, Ministry of Agriculture & Rural Development, Agricultural Research Organization (ARO) (Volcani Center), Rishon-LeZion (IL); Israel Oceanographic and Limnological Research, Ltd. (PBC), Haifa (IL)

(72) Inventors: Amir Bitan, Meitar (IL); William Koven, Eilat (IL); Amos Tandler, Eilat (IL); Guy Allon, Rehovot (IL)

(73) Assignees: The State of Israel, Ministry of Agriculture & Rural Development, Agricultural Research Organization (ARO) (Volcani Center), Rishon-LeZion (IL); Israel Oceanographic and Limnological Research, Ltd. (PBC), Haifa (IL)

( * ) Notice: Subject to any disclaimer, the term of this patent is extended or adjusted under 35 U.S.C. 154(b) by 719 days.

(21) Appl. No.: 16/762,233

(22) PCT Filed: Nov. 8, 2018

(86) PCT No.: PCT/IL2018/051208
§ 371 (c)(1),
(2) Date: May 7, 2020

(87) PCT Pub. No.: WO2019/092718
PCT Pub. Date: May 16, 2019

(65) Prior Publication Data
US 2021/0068426 A1    Mar. 11, 2021

Related U.S. Application Data

(60) Provisional application No. 62/583,000, filed on Nov. 8, 2017.

(51) Int. Cl.
*A23K 50/80* (2016.01)
*A01K 61/10* (2017.01)
*A01K 61/59* (2017.01)
*A23K 20/105* (2016.01)

(52) U.S. Cl.
CPC .............. *A23K 50/80* (2016.05); *A01K 61/10* (2017.01); *A01K 61/59* (2017.01); *A23K 20/105* (2016.05)

(58) Field of Classification Search
CPC ...... A23K 50/80; A23K 20/105; A01K 61/10; A01K 61/59; Y02A 40/81
See application file for complete search history.

(56) References Cited

U.S. PATENT DOCUMENTS

| | | |
|---|---|---|
| 4,808,417 A | 2/1989 | Masuda |
| 7,795,204 B2 | 9/2010 | Gardiner et al. |
| 2007/0264313 A1 | 11/2007 | Musser et al. |
| 2012/0029077 A1 | 2/2012 | Han et al. |
| 2013/0142905 A1 | 6/2013 | Gibbons et al. |
| 2017/0007573 A1 | 1/2017 | Nezami |
| 2017/0215464 A1 | 8/2017 | Lambers et al. |

FOREIGN PATENT DOCUMENTS

| | | |
|---|---|---|
| CN | 101647517 | 2/2010 |
| CN | 103583900 | 2/2014 |
| CN | 104222534 | 12/2014 |
| CN | 104286578 | 1/2015 |
| CN | 104664174 | 6/2015 |
| CN | 103815206 | 8/2015 |
| CN | 105211572 | 1/2016 |
| CN | 106721516 | * 11/2016 |
| CN | 106721651 | 5/2017 |
| CN | 106819487 | 6/2017 |
| WO | WO 2006/126889 | 11/2006 |
| WO | WO 2008/115563 | 9/2008 |
| WO | WO 2017/083067 | 5/2017 |
| WO | WO 2019/092718 | 5/2019 |

OTHER PUBLICATIONS

Supplementary European Search Report and the European Search Opinion Dated Aug. 9, 2021 From the European Patent Office Re. Application No. 18876582.0. (16 Pages).

Bakke et al. "Dietary Protein Hydrolysates and Free Amino Adds Affect the Spatial Expression of Peptide Transporter PepTI in the Digestive Tract of Atlantic Cod (*Gadus morhua*)", Comparative Biochemistry and Physiology Part B: Biochemistry and Molecular Biology, 156(1):48-55, XP026977268, May 2010.

Kim et al. "Comparison of Taurine Biosynthesis Ability Between Juveniles of Japanese Flounder and Common Carp", Amino Acids, 35:161-168, XP019634503, Mar. 10, 2008.

Lin et al. "Effects of Dietary Organic Acid Supplementation on the Growth, Nutrient Digestibility and Intestinal Histology of the Giant Grouper *Epinephelus lanceolatus* Fed A Diet with Soybean Meal", Aquaculture, 469:106- 111,XP029872262,, Feb. 20, 2017.

Liu et al. "Characterization and Dietary Regulation of Oligopeptide Transporter (PepTI) in Different Ploidy Fishes", Peptides, 52:149-156, XP0286024035, Feb. 2014.

(Continued)

*Primary Examiner* — Sahar Javanmard

(57) ABSTRACT

A method of feeding an aquaculture of an aquatic animal species of interest is provided. The method comprising providing the aquaculture with an aquaculture feed comprising a sub-optimal dose of protein and an effective amount of butyric acid or salt thereof, the effective amount facilitating reducing feed conversion ratio (FCR). Also provided are feed compositions for aquaculturing.

25 Claims, 10 Drawing Sheets
Specification includes a Sequence Listing.

(56) References Cited

OTHER PUBLICATIONS

Perez-Sanchez et al. "Effects of Butyrate Feed Supplementation on Gilthead Sea Bream (*Sparus aurata*) Growth Performance and Intestinal Health: A Transcriptomic Approach", Conference Proceedings "To the Next 40 Years Of Sustainable Global Aquaculture", XP055828189, Abstract, Nov. 2013.

Zhang et al. "Effects of Sodium Butyrate on Feeding, Growth Performance and Antioxidant Capacity of Anguilla Rostrata", 26(4):549-551, XP055828671,Chinese Document with English Abstract, 2011.

Zheng et al. "The Effect of Sodium Butyrate on the Growth Performance and Intestinal! Mucous Structure of Fresh Water Fish", Chinese Master's Thesis with English Abstract, p. 1-30, XP009528987, Dec. 2008.

Notification of Office Action and Search Report Dated Jul. 2, 2021 From the State Intellectual Property Office of the People's Republic of China Re. Application No. 201880082408.4 and Its Translation Into English. (11 Pages).

Relatório de Busca e Parecer [Search Report and Opinion] Dated Jul. 28, 2022 From the Serviço Público Federal, Ministério da Economia, Instituto Nacional da Propriedade Industrial do Brasil Re. Application No. BR112020009097-2 and Its Translation Into English. (10 Pages).

Examination Report Dated Oct. 16, 2020 From the Ministry of Science and Technology, The National Office of Intellectual Property, NOIP of the Socialist Republic of Vietnam Re. Application No. 1-2020-03245 and Its Translation Into English. (2 Pages).

Notification of Office Action and Search Report Dated Jul. 5, 2022 From the State Intellectual Property Office of the People's Republic of China Re. Application No. 201880082408.4 and Its Summary In English. (11 Pages).

International Preliminary Report on Patentability Dated May 22, 2020 From the International Bureau of WIPO Re. Application No. PCT/IL2018/051208. (6 Pages) International Search Report and the Written Opinion Dated Feb. 17, 2019 From the International Searching Authority Re. Application No. PCT/IL2018/051208. (11 Pages).

International Search Report and the Written Opinion Dated Feb. 17, 2019 From the International Searching Authority Re. Application No. PCT/IL2018//051208. (11 Pages).

Aerts et al. "Taurine and Taurine-Deficiency in the Perinatal Period", Journal of Perinatal Medicine, 30(4): 281-286, Jul. 26, 2002.

Batista et al. "Taurine Supplementation Restores Insulin Secretion and Reduces ER Stress Markers in Protein-Malnourished Mice", Taurine, 8(Chap.14): 129-139, 2013.

Benedito-Palos et al. "Lasting Effects of Butyrate and Low FM/FO Diets on Growth Performance, Blood Haematology/Biochemistry adn Molecular Growth-Related Markers in Gilthead Sea Bream (*Sparus aurata*)", Aquaculture, 454: 8-18, Mar. 1, 2016.

Berkovich et al. "Intra-Pituitary Relationship of Follicle Stimulating Hormone and Luteinizing Hormone During Pubertal Development in Atlantic Bluefin Tuna (*Thunnus thynnus*)", General and Comparative Endocrinology, 194: 10-23, Available Online Aug. 20, 2013.

Borck et al. "Taurine Supplementation Induces Long-Term Beneficial Effects on Glucose Homeostasis in Ob/Ob Mice", Amino Acids, 50(6): 765-774, Published Online Mar. 19, 2018.

Branco et al. "Protein Malnutrition Blunts the Increment of Taurine Transporter Expression by A High-Fat Diet and Impairs Taurine Reestablishment of Insulin Secretion", The FASEB Journal, 31(9): 4078-4087, Published Online Jun. 1, 2017.

Camargo et al. "Taurine Supplementation Preserves Hypothalamic Leptin Action in Normal and Protein-Restricted Mice Fed on A High-Fat Diet", Amino Acids, 47(11): 2419-2435, Published Online Jul. 2, 2015.

Chang et al. "Dietary Sodium Butyrate Supplementation Promotes Oxidative Fiber Formation in Mice", Animal Biotechnology, 29(3): 212-215, Published Online Aug. 28, 2017.

Chesney et al. "Studies on Renal Adaption to Altered Dietary Amino Acid Intake: Tissue Taurine Responses in Nursing and Adult Rats", The Journal of Nutrition, 116(10): 1965-1976, Oct. 1986.

Den Besten et al. "Short-Chain Fatty Acids Protect Against High-Fat Diet-Induced Obesity Via A PPAR[Gamma]-Dependent Switch From Lipogenesis to Fat Oxidation", Diabetes, 64(7): 2398-2408, Published Online Feb. 18, 2015.

Estensoro et al. "Dietary Butyrate Helps to Restore the Intestinal Status of A Marine Teleost (*Sparu aurata*) Fed Extreme Diets Low in Fish Meal and Fish Oil", PLOS ONE, 11(11): e0166564-1-e0166564-21, Published Online Nov. 29, 2016.

Ghisolfi "Taurine and the Premature", Biology of the Neonate, 52(Suppl.1): 78-86, 1987.

Guilloteau et al. "From the Gut to the Peripheral Tissues: The Multiple Effects of Butyrate", Nutrition Research Reviews, 23(2): 366-384, Published Online Oct. 12, 2010.

Han et al. "Functional Expression of Rat Renal Cortex Taurine Transporter in Xenopus Laevis Oocytes: Adaptive Regulation by Dietary Manipulation", Pediatric Research, 41(5): 624-631, Published Online May 1, 1997.

Han et al. "The Taurine Transporter: Mechanisms of Regulation", Acta Physiologica, 187(1-2): 61-73, May-Jun. 2006.

Hosseinifar et al. "Short-Chain Fatty Acids as Feed Supplements for Sustainable Aquaculture: An Updated View", Aquaculture Research, 48(4): 1380-1391, Published Online Nov. 30, 2016.

Ibrahim et al. "Antitumor and Immune-Modulatory Efficacy of Dual-Treatment Based on Levamisole and/or Taurine in Ehrlich Ascites Carcinoma-Bearing Mice", Biomedicine & Pharmacotherapy, 106: 43-49, Published Online Jun. 23, 2018.

Lin et al. "Butyrate and Propionate Protect Against Diet-Induced Obesity and Regulate Gut Hormones Via Free Fatty Acid Receptor 3-Independent Mechanisms", PLoS ONE, 7(4): e35240-1-e35240-9, Published Online Apr. 10, 2012.

Liu et al. "Effects of Dietary Microencapsulated Sodium Butyrate on Growth, Intestinal Mucosal Morphology, Immune Response and Adhesive Bacteria in Juvenile Common Carp (*Cyprinus carpio*) Pre-Fed With or Without Oxidised Oil", British Journal of Nutrition, 112(1): 15-29, Published Online Apr. 28, 2014.

Murakami et al. "Taurine Attenuates the Development of Hepatic Steatosis Through the Inhibition of Oxidative Stress in A Model of Nonalcoholic Fatty Liver Disease In Vivo and In Vitro", Amino Acids, 50(9): 1279-1288, Published Online Jun. 26, 2018.

Ripps et al. "Review: Taurine: A 'Very Essential' Amino Acid", Molecular Vision, 18: 2673-2686, Published Online Nov. 12, 2012.

Robles et al. "Effect of Partially Protected Butyrate Used as Feed Additive on Growth and Intestinal Metabolism in Sea Bream (*Sparus aurata*)", Fish Physiology and Biochemistry, 39(6): 1567-1580, Published Online Jun. 5, 2013.

Seidel et al. "Taurine: A Regulator of Cellular Redox Homeostasis and Skeletal Muscle Function", Molecular Nutrition & Food Research, 13: e1800569-1-e1800569-14, Published Online Sep. 13, 2018.

Terrill et al. "Beneficial Effects of High Dose Taurine Treatment in Juvenile Dystrophic MDX Mice Are Offset by Growth Restriction", PLOS ONE, 12(11): e0187317-1-e0187317-15, Published Online Nov. 2, 2017.

Examination Report Dated Feb. 15, 2022 From the Kementerian Hukum Dan Hak Asasi Manusia Republik Indonesia, Direktorat Jenderal Kekayaan Intelektual [Ministry of Law and Human Rights of Republic Indonesia, Directorate General of Intellectual Propery Rights] Re. Application No. P00202004036 and Its Translation Into English. (10 Pages).

Examination Report Under Sections 12 & 13 of the Patents Act, 1970 and the Patents Rules, 2003 Dated Mar. 24, 2022 From the Government of India, Intellectual Property India, Patents, Designs, Trade Marks, Geographical Indications, The Patent Office Re. Application No. 202027023300. (7 Pages).

Expert Opinion and Search Report Dated Jan. 27, 2022 From the Ministerio de Economia, Fomento y Turismo, Instituto Nacional de Propiedad Industrial, INAPI, Gobierno de Chile Re. Application No. 202001187. (20 Pages).

Translation Dated Mar. 16, 2022 of Expert Opinion and Search Report Dated Jan. 27, 2022 From the Ministerio de Economia, Fomento y Turismo, Instituto Nacional de Propiedad Industrial, INAPI, Gobierno de Chile Re. Application No. 202001187. (15 Pages).

(56) References Cited

OTHER PUBLICATIONS

Office Action Dated Feb. 22, 2023 From the Israel Patent Office Re. Application No. 274524. (4 Pages).
Technical Report Dated Mar. 15, 2023 From the Egyptian Patent Offfice Re. Application No. PCT670/2020 and its Translation into English. (12 Pages).
English Summary Dated Feb. 7, 2023 of Notification of Office Action Dated Jan. 18, 2023 From the State Intellectual Property Office of the People's Republic of China Re. Application No. 201880082408.4. (2 pages).
Notification of Office Action Dated Jan. 18, 2023 From the State Intellectual Property Office of the People's Republic of China Re. Application No. 201880082408.4. (8 Pages).
Technical Report Dated Oct. 10, 2022 From the Egyptian Patent Offfice Re. Application No. 2020050670 and itss Translation into English. (15 Pages).
Hearing Notice Dated Aug. 10, 2023 From the Government of India, Intellectual Property India, The Patent Office Re. Application No. 202027023300. (2 Pages).
English Translation of Examination Report Dated Nov. 9, 2023 From the Servico Publico Federal, Ministerio da Economia, Instituto Nacional da Propriedade Industrial do Brasil RE Application No. BR112020009097-2. (4 Pages).
Hearing Notice Dated Dec. 8, 2023 From the Government of India, Intellectual Property India, The Patent Office Re. Application No. 202027023300 and pending claims. (6 Pages).

* cited by examiner

SEQUENCE LISTING

<160> NUMBER OF SEQ ID NOS: 16

<210> SEQ ID NO 1
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 1
tctgaagctc tccttgaggc                    20

<210> SEQ ID NO 2

```
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 2
gacagtgaga gcttttctgc                                               20

<210> SEQ ID NO 3
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 3
ggcttcagtc ctccagagtt                                               20

<210> SEQ ID NO 4
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 4
ggcggttctg gaaccaga                                                 18

<210> SEQ ID NO 5
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 5
tcgatggtac tttctgtgcc                                               20

<210> SEQ ID NO 6
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 6
tggatgtggt agccgtttct                                               20

<210> SEQ ID NO 7
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 7
agatgcagtg ctaccctctg                                               20

<210> SEQ ID NO 8
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 8
```
tgtacatacc gcttccaacg                                               20

<210> SEQ ID NO 9
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 9
ctcgcccttg tgtttgagac                                               20

<210> SEQ ID NO 10
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 10
ctcgcccttg tgtttgagac                                               20

<210> SEQ ID NO 11
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 11
gttcaccggg cagtcatct                                                19

<210> SEQ ID NO 12
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 12
cagtcgtacg ggttcctcc                                                19

<210> SEQ ID NO 13
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 13
cagacaggga ctacttgggg                                               20

<210> SEQ ID NO 14
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 14
agtactcgta ctcctctgcg                                               20

<210> SEQ ID NO 15
<211> LENGTH: 20
<212> TYPE: DNA

```
<213> ORGANISM: Artificial sequence
<220> FEATURE:
<223> OTHER INFORMATION: Single strand DNA oligonucleotide

<400> SEQUENCE: 15
agaagagcta tgagctgccc                                               20

<210> SEQ ID NO 16
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 16
ggactccata ccgaggaagg                                               20
```

COMPOSITIONS AND METHODS FOR AQUACULTURING

RELATED APPLICATIONS

This application is a National Phase of PCT Patent Application No. PCT/IL2018/051208 having International filing date of Nov. 8, 2018, which claims the benefit of priority under 35 USC § 119(e) of U.S. Provisional Patent Application No. 62/583,000 filed on Nov. 8, 2017. The contents of the above applications are all incorporated by reference as if fully set forth herein in their entirety.

SEQUENCE LISTING STATEMENT

The ASCII file, entitled 82719SequenceListing.txt, was created on Sep. 15, 2020, and comprises 3,781 bytes.

FIELD AND BACKGROUND OF THE INVENTION

The present invention, in some embodiments thereof, relates compositions and methods for aquaculturing.

More than seventy three million tons of fish were produced in aquaculture during 2014 with an estimated value of US $160 billion (FAO. 2016). To support fish production, compound aqua feeds are formulated to meet the known nutrients requirements for protein, lipids, carbohydrates, vitamins and minerals and to contain functional materials other than nutrients such as attractants, anti-oxidants, immunostimulants, enzymes, pigments, organic acids, prebiotics, probiotics, feeding stimulants, antibiotics, and hormones (Lall and Dumas., 2015). High levels of dietary protein are required in the fish diet while supply of protein ingredients is a major constraint to the growth of aquaculture production. Hence, reducing protein levels in fish diet without compromising growth performance is of high importance.

Butyric acid is a four carbon, short chain fatty acid (SCFA), naturally produced by bacterial fermentation of carbohydrates and dietary fibers in the colon of vertebrates (Cummings, 1981). Butyrate (and other SCFAs) produced in the lumen was found to be rapidly metabolized by colonocytes (Roediger W E, 1996) and was demonstrated to be the main intestinal fuel even in the presence of competing substrates (Clausen and Mortensen, 1994). In addition to providing epithelial cells with energy, butyrate markedly increases intestinal cell proliferation, affects differentiation and enterocyte maturation, reduces apoptosis of normal enterocytes and is found to improve colonic barrier function (Cook and Sellin, 1998; Mariadason et al., 1999; McIntyre et al., 1993; Sengupta et al., 2006). Ingestion of butyrate was demonstrated to modify the microstructure of the intestine in rats and piglets (Sakata, 1987; Bartholome et al., 2004), by increasing the intestinal crypt depth and villi height leading to improved intestinal mucosa function in piglets (Lu et al., 2008; Kotunia et al., 2004). This was demonstrated in calves and pigs which exhibited improved growth and feed conversion ratio (FCR) when butyrate was supplemented to their diet (Guilloteau et al., 2009; Partanen and Mroz, 1999). It was demonstrated that the addition of butyrate to human intestinal epithelial Caco2-BBE cells culture medium significantly increased the expression of PepT1 (Dalmasso et al., 2008), PepT1 is a low-affinity, high capacity transporter that mediates the uptake of the vast majority of the potential 400 dipeptides and 8,000 tripeptides that are the result of the partial digestion of protein (Daniel, 2004).

Taurine is a semi-essential β-amino acid that is not incorporated into protein. It is involved mainly in cellular osmoregulation and muscular function. Fish, like newborn mammals, rely and benefit from dietary supplementation of taurine due to limited or deficient synthesis ability. However, long exposure to high extracellular taurine levels was reported to negatively modulate taurine absorption through reduction in transcription and activity of the sodium chloride high-affinity, low-capacity taurine transporter, TauT (SLC6A6) (Lambert et al., 2015).

RELATED ART

CN104664174
US20120029077
US20070264313
WO2006126889
CN104222534
U.S. Pat. No. 4,808,417

SUMMARY OF THE INVENTION

According to an aspect of some embodiments of the present invention there is provided a method of feeding an aquaculture of an aquatic animal species of interest, the method comprising providing the aquaculture with an aquaculture feed comprising a sub-optimal dose of protein and an effective amount of butyric acid or salt thereof, the effective amount facilitating reducing feed conversion ratio (FCR).

According to an aspect of some embodiments of the present invention there is provided a method of increasing relative weight gain (RWG), specific growth rate (SGR) and reducing feed conversion ratio (FCR) of an aquaculture of an aquatic animal species of interest, the method comprising providing the aquaculture with an aquaculture feed comprising a sub-optimal dose of protein and an effective amount of butyric acid or salt thereof, the effective amount facilitating in increasing RWG, SGR and reducing FCR.

According to an aspect of some embodiments of the present invention there is provided a method of improving feed and protein utilization of an aquaculture of an aquatic animal species of interest, the method comprising providing the aquaculture with an aquaculture feed comprising a sub-optimal dose of protein and an effective amount of butyric acid or salt thereof, the effective amount facilitating reducing feed conversion ratio (FCR).

According to an aspect of some embodiments of the present invention there is provided an aquaculture feed identified for feeding a species of interest, the feed comprising at least 15% by weight lower protein concentration than that optimal for the species at a predetermined developmental stage, and an effective amount of butyric acid or salt thereof, the effective amount facilitating reducing feed conversion ratio (FCR).

According to some embodiments of the invention, the aquatic animal species of interest comprises fish.

According to some embodiments of the invention, the fish species of interest comprises a plurality of individuals of the fish species of interest at a predetermined developmental stage.

According to some embodiments of the invention, the feed further comprises taurine or salt thereof.

According to some embodiments of the invention, the feed further comprises taurine or salt thereof at an effective amount, which synergizes with the butyric acid to facilitate FCR.

According to some embodiments of the invention, the effective amount of taurine or salt thereof comprises 0.1-5% by weight.

According to some embodiments of the invention, the effective amount of taurine or salt thereof comprises 1-1.5% by weight.

According to some embodiments of the invention, the feed further comprises nutritional ingredients selected from the group consisting of fat, carbohydrate, vitamins and minerals.

According to some embodiments of the invention, the feed comprises an ingredient selected from the group consisting of fishmeal, fish oil, poultry meal, poultry by-product meal, feather meal, meat meal, blood meal, bone meal, rapeseed, corn gluten, linseed, poultry oil, wheat and soy and their derivatives, lupin meal, pea protein, sunflower meal, faba bean meal, canola oil, algae, micro algae, seaweed, periphyton and agricultural or animal industry by-products.

According to some embodiments of the invention, the feed further comprises an additional additive selected from the group consisting of an attractants, anti-oxidants, immunostimulants, enzymes, pigments, organic acids, prebiotics, probiotics, feeding stimulants, antibiotics, hormones and binders.

According to some embodiments of the invention, the salt of butyric acid is selected from the group consisting of sodium butyrate, ethyl butyrate, methyl butyrate, pentyl butyrate and a combination of same.

According to some embodiments of the invention, the feed comprises at least 15% by weight lower protein concentration than that optimal for the species at a predetermined developmental stage.

According to some embodiments of the invention, the feed comprises not more than 45% by weight protein.

According to some embodiments of the invention, the feed comprises not more 40% by weight protein.

According to some embodiments of the invention, the feed comprises not more than 35% by weight protein.

According to some embodiments of the invention, the feed comprises not more than 30% by weight protein.

According to some embodiments of the invention, the feed comprises not more than 25% by weight protein.

According to some embodiments of the invention, the effective amount of butyric acid or salt thereof comprises 0.01-5% by weight.

According to some embodiments of the invention, the effective amount comprises 0.1-1.6% by weight butyric acid or salt thereof.

According to some embodiments of the invention, the protein comprises a vegetative protein.

According to some embodiments of the invention, the protein comprises a non-vegetative protein.

According to some embodiments of the invention, the protein comprises a fish protein, a poultry protein or a combination of same.

According to some embodiments of the invention, the feed is formulated as a pellet.

According to some embodiments of the invention, the feed is agglomerated, granulated, pressed or extruded type.

According to some embodiments of the invention, the fish is a marine fish.

According to some embodiments of the invention, the fish is a carnivore fish.

According to some embodiments of the invention, the fish is selected from the group of Fish listed in Table 2.

According to some embodiments of the invention, the fish is in at least a juvenile developmental stage.

According to some embodiments of the invention, a majority of the fish in the aquaculture are at least 3 gr.

According to some embodiments of the invention, the feed comprises a minimum of 5% total lipids and/or 5-50% carbohydrates.

According to some embodiments of the invention, the providing is effected not more than once in 24 hours.

According to some embodiments of the invention, the providing is effected once a week.

According to some embodiments of the invention, the providing is effected once two weeks.

According to some embodiments of the invention, the providing is effected once three weeks.

According to some embodiments of the invention, the providing is effected every 1-3 weeks.

According to some embodiments of the invention, the providing is effected every 2-3 weeks.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

(FIG. 2A) the effect of butyrate or taurine or both on liver taurine content (mg $g^{-1}$ DW). (FIG. 2B) the effect of butyrate or taurine or both on muscle taurine content (mg $g^{-1}$ DW).

(FIG. 5A) PepT1 mRNA relative expression in fish (n=8) fed for 8 days with experimental diets containing 0, 0.8 and 1.6% of sodium butyrate. Mean values of columns having different letters were significantly (P<0.001) different. (FIGS. 5B, C) PepT1 mRNA relative expression measured at days 9, 12 and 15 in sea bream (n=8) fed with the control and (FIG. 5B) 0.8% and (FIG. 5C) 1.6% of sodium butyrate for 8 days before being fed the control diet only. For each day asterisks above column indicate a significant (p<0.05; t-test) difference between the two treatments. (FIG. 5A) $F_{2,21}$=13.51, P<0.001; one-way ANOVA.

DESCRIPTION OF SPECIFIC EMBODIMENTS OF TILE INVENTION

Figure 1:
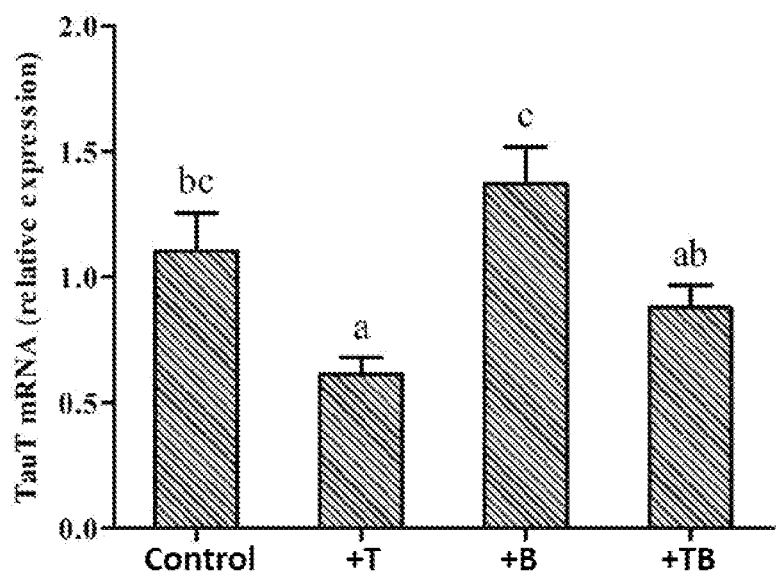
FIG. 1 is a graph showing the effect of butyrate (B) or taurine (T) or both (TB) on TauT mRNA relative expression in the proximal intestine of juvenile white groupers (*Epinephelus aeneus*) fed with experimental diets containing 0 or 0.1% sodium butyrate and 0 or 1.5% taurine. Mean values of columns having different letters were significantly ($P<0.05$) different.

The present invention, in some embodiments thereof, relates to compositions and methods for aquaculturing.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

An aspect of the invention relates to a method of feeding an aquaculture of an aquatic animal species of interest, the method comprising providing the aquaculture with an aquaculture feed comprising a sub-optimal dose of protein and an effective amount of butyric acid or salt thereof, said effective amount facilitating reducing feed conversion ratio (FCR).

An aspect of the invention relates to a method of feeding an aquaculture of an aquatic animal species of interest, the method comprising providing the aquaculture with an aquaculture feed comprising an effective amount of butyric acid or salt thereof, said effective amount facilitating reducing feed conversion ratio (FCR).

An aspect of the invention relates to a method of increasing relative weight gain (RWG), specific growth rate (SGR) and reducing feed conversion ratio (FCR) of an aquaculture of an aquatic animal species of interest, the method comprising providing the aquaculture with an aquaculture feed comprising a sub-optimal dose of protein and an effective amount of butyric acid or salt thereof, said effective amount facilitating in increasing RWG, SGR and reducing FCR.

An aspect of the invention relates to a method of increasing relative weight gain (RWG), specific growth rate (SGR) and reducing feed conversion ratio (FCR) of an aquaculture of an aquatic animal species of interest, the method comprising providing the aquaculture with an aquaculture feed comprising an effective amount of butyric acid or salt thereof, said effective amount facilitating in increasing RWG, SGR and reducing FCR.

An aspect of the invention relates to a method of improving feed and protein utilization of an aquaculture of an aquatic animal species of interest, the method comprising providing the aquaculture with an aquaculture feed comprising a sub-optimal dose of protein and an effective amount of butyric acid or salt thereof, said effective amount facilitating reducing feed conversion ratio (FCR).

An aspect of the invention relates to a method of improving feed and protein utilization of an aquaculture of an aquatic animal species of interest, the method comprising providing the aquaculture with an aquaculture feed comprising an effective amount of butyric acid or salt thereof, said effective amount facilitating reducing feed conversion ratio (FCR).

An aspect of the invention relates to an aquaculture feed identified for feeding a species of interest, the feed comprising at least 15% by weight lower protein concentration than that optimal for the species at a predetermined developmental stage, and an effective amount of butyric acid or salt thereof, said effective amount facilitating reducing feed conversion ratio (FCR).

The results presented herein support a plurality of roles for butyrate:
(i) increasing protein absorption by affecting intestinal morphology e.g., gut index, intestine surface area, di and tri peptide transporter.
(iii) increasing taurine absorption into the tissues e.g., muscle, live, probably by increasing transcription of the taurine transporter.
RWG: relative weight gain=(weight gain/initial weight)×100.
SGR: specific growth rate=100×ln(final weight initial weight)/days of trial.
FCR: feed conversion ratio=feed offered (g)/weight gain (g).
PER: protein efficiency ratio=weight gain (g)/protein intake (g).
PPV: protein productive value=fish protein gain (g)×100/protein intake (g).
Gut index=100×body weight (g)/[intestine length (mm)]³

As used herein "increasing" or "decreasing" is as compared to the same feed without Butyric acid or salt thereof or Taurine salt thereof or combinations of same, given to the same population (same species and developmental stage) of cultivated animals in terms of growth conditions, feed composition, feeding regimen, also referred to as "control".

As used, herein "feed utilization" refers to the proportion of feed, which can be utilized by the fish for growth or maintenance as measured by FCR.

As used herein "feeding" refers to the act of providing an aquaculture with a man-made composition that is formulated for feeding fish species of interest.

As used herein "an aquaculture" or "aquaculturing" refers to cultivation of aquatic populations (e.g., freshwater, saltwater aquatic animals e.g., saltwater, brackish water) under controlled conditions. Aquatic animals grown in an aquaculture may include fish and crustaceans. It will be appreciated, that although some of the description relates to fish in more details, the invention may not be limited to fish but include also crustaceans. Crustaceans are, for example, lobsters, crabs, shrimp, prawns and crayfish. Examples of cultivated fish are provided hereinbelow (Table 2).

According to a specific embodiment, the aquatic animal is a marine fish or crustacean.

According to a specific embodiment, the aquatic animal is a diadromous fish or crustacean.

According to a specific embodiment, the aquatic animal is a freshwater fish or crustacean.

According to a specific embodiment, the aquatic species is carnivore (e.g., carnivore fish).

According to a specific embodiment, the aquatic species is herbivore (e.g., herbivore fish).

According to a specific embodiment, the aquatic species is omnivore e.g., omnivore fish).

According to a specific embodiment, the fish is a finfish.

The farming of fish and crustaceans is the most common form of aquaculture. It involves raising fish, for example, commercially in tanks, ponds, or ocean enclosures, cages, usually for food. Other contemplated uses and products of aqua-culturing are provided below.

According to a specific embodiment, the fish are fish of the salmonid group, for example, cherry salmon (*Oncorhynchus masou*), Chinook salmon (*Oncorhynchus tshawytscha*), chum salmon (*Oncorhynchus keta*), coho salmon (*Oncorhynchus kisutch*), pink salmon (*Oncorhynchus gorbuscha*), sockeye salmon (*Oncorhynchus nerka*) and Atlantic salmon (*Salmo salar*). Other fish of interest for aquaculture include, but are not limited to, various trout, as well as whitefish such as tilapia (including various species of *Oreochromis, Sarotherodon,* and Tilapia), grouper (subfamily Epinephelinae), sea bass, sea bream, catfish (order Silurifomies), bigeye tuna (*Thunnus obesus*), carp (family Cyprimidae) and cod (genus *Gadus*). Other fish species that may be used according to the present teachings are provided hereinbelow (Table 2).

Contemplated are both lower-value staple food fish species [e.g., freshwater fish such as carp, tilapia and catfish] and higher-value cash crop species for luxury or niche markets [e.g., mainly marine and diadromous species such as shrimp, salmon, trout, yellowtail, seabass, seabream and grouper]).

According to a specific embodiment, the fish is a White Grouper.

According to a specific embodiment, the fish is a Gilthead Seabream.

According to a specific embodiment, the aquaculture is a monoculture comprising essentially a single fish species.

Since the present teachings relate to mass production, the present teachings relate to a plurality of individuals. It will be appreciated that when relating to a single fish species (monoculture), the present invention does not exclude the presence of other species in the aquaculture (bycatch).

Thus, the cultivated species in the culture are characterized, according to a specific embodiment, by a synchronized growth.

According to a specific embodiment, the fish species of interest comprises a plurality of individuals of a specific species on interest all being at about (e.g., +/_10%, 20%, 30% or 40%) the same developmental stage.

According to a specific embodiment, the fish is at a developmental stage between larvae and adult or broadstock stage.

According to a specific embodiment, the fish is in at least a juvenile developmental stage.

According to a specific embodiment, the fish is in at least a juvenile developmental stage e.g., nursing stage, juvenile stage, fingerling stage, fry stage, post larvae stage, dependent on the species.

According to a specific embodiment, the fish is up to grower/growout/parr/smolt/adult developmental stage or the broodstock stage. The names and stages are different between species of fish and also crustaceans.

According to a specific embodiment, a majority of the fish in the aquaculture are at least 0.5 gr.

According to a specific embodiment, a majority of the fish in the aquaculture are at least 1 gr.

According to a specific embodiment, a majority of the fish in the aquaculture are at 1.5 gr.

According to a specific embodiment, a majority of the fish in the aquaculture are at least 2 gr.

According to a specific embodiment, a majority of the fish in the aquaculture are at least 2.5 gr.

According to a specific embodiment, a majority of the fish in the aquaculture are at least 3 gr.

According to other specific embodiments, the aquaculture comprises a plurality of species (polyculture, e.g., 2, 3, 4) having compatible growth conditions requirements. For example the following combinations are known to be co-cultured: tilapia and carp; tilapia and grey mullet.

As used herein, the term "feed" or "aquafeed" relates to a manufactured or artificial diet (i.e., formulated feeds) to supplement or to replace natural feeds in the aquaculture industry. These prepared foods are most commonly formulated as flake, pellet or tablet form.

According to a specific embodiment, the feed is agglomerated, granulated or extruded.

These formulated feeds are composed of several ingredients in various proportions complementing each other to form a nutritionally complete diet for the aquacultured species or a functional feed such as a medical diet, broadstock diet or finishing diet.

Feeds are typically composed of micro and macro components. In general, all components, which are used at levels of more than 1%, are considered as macro components. Feed ingredients used at levels of less than 1% are micro components. Both macro and micro ingredients are subdivided into components with nutritional functions and technical functions. Components with technical functions improve the physical quality of the aquaculture feed composition or its appearance.

Macro components with nutritional functions provide aquatic animals with protein and energy required for growth and performance. The feed (e.g., for fish) should ideally provide the animal with: 1) fats, which serve as a source of fatty acids for energy (especially for heart and skeletal muscles); and, 2) amino acids, which serve as building blocks of proteins. Fats also assist in vitamin absorption; for example, vitamins A, D, E and K are fat-soluble or can only be digested, absorbed, and transported in conjunction with fats. Carbohydrates, are also often included in the feed compositions, although carbohydrates are not a superior energy source for fish over protein or fat. Carbohydrates are typically provided in a range of 5-50% of the composition by weight. Minerals and vitamins are also typically included as micro components as well as others.

Thus, according to a specific embodiment, the feed comprises lysine, methionine, lipids, biotin, choline, niacin, ascorbic acid, inositol, pantothenic acid, folic acid, pyridoxine, riboflavin, thiamin, vitamin A, vitamin B 12, vitamin D, vitamin E, vitamin K, calcium, phosphorus, potassium, sodium, magnesium, manganese, aluminum, iodine, cobalt, zinc, iron, selenium, or combinations of same.

Fats are typically provided via incorporation of fish meals (which contain a minor amount of fish oil) and fish oils into the feed compositions. Extracted oils that may be used in feeds include fish oils (e.g., from the oily fish menhaden, anchovy, herring, capelin and cod liver), and vegetable oil (e.g., from soybeans, rapeseeds, sunflower seeds and flax seeds). Typically, fish oil is the preferred oil, because it contains the long chain omega-3 polyunsaturated fatty acids (PUFAs), EPA and DHA; in contrast, vegetable oils do not provide a source of EPA and/or DHA. These PUFAs are needed for growth and health of most aquaculture products. A typical feed will comprise from about 5-30% or 15-30% of oil (e.g., fish, vegetable, etc.), measured as a weight percent of the aquaculture feed composition.

According to a specific embodiment, the feed comprises a minimum of 5% total lipids and/or 5-50% carbohydrates.

As used herein "protein" refers to proteins, peptides and/or amino acids (e.g., lysine, methionine, biotine).

According to a specific embodiment, the protein is a vegetative protein, derived from a plant.

According to a specific embodiment, the protein is a non-vegetative protein, e.g., animal.

According to a specific embodiment, the protein comprises a fish protein, a poultry protein or a combination of same.

According to a specific embodiment, the protein is a synthetic protein,

According to a specific embodiment, the protein is a purified protein.

According to a specific embodiment, the protein is essentially of a single type.

According to a specific embodiment, the protein is a plurality of proteins (of different types e.g., at least 2, 3, 4, 5 etc.).

For instance, often times a combination of proteins from lupin seed, corn, soy, wheat and pea is used. Other protein sources which are vegetative include cereal gains and plant proteins.

Protein found in soybeans is another embodiment. Commercial sources of soy protein are generally available in a variety of different forms that vary in their composition and protein content. In general, soy protein products contain between 30-70% protein depending on the degree of post-harvest processing of the bean meal. Commercially available sources of soy protein suitable for use according to some embodiments, include, but are not limited to include SOYCOMIL® (Product Code: 065311), which is sold by Archer Daniels Midland Company (ADM), and PisciZyme or ME-PRO™, which are sold by Prairie AquaTech (Brookings, S. Dak.), (See, e.g., U.S. Pub. No. 2013/0142905, herein incorporated by reference in its entirety).

According to a specific embodiment, the protein is a protein preparation such as a meal.

As used herein, the term "feed meal" refers to a protein-rich feed component derived from cereals, plants, animals or fish. Feed meals may be provided in comminuted and/or dried form.

According to a specific embodiment, meals may be selected from fish meal, chicken meal, soybean meal, hydrolyzed feather meal, blood meal, meat and bone meal. According to a specific embodiment, the feed meal is fish meal or chicken meal.

As used herein, "fish meal" refers to meal produced by the boiling of landed fish and other aquatic animal species (either caught or produced), separating out water and oil (e.g. by use of a press), and then drying. Normally fish meal is dried to a moisture content of less than or equal to about 10%, and then the fish meal is distributed at room temperature. Many fish species may be used as the raw material of fish meal, such as horse mackerel, true sardine, various other sardines, mackerel, herring, capelin smelt, sand eel, various types of codfish, and Antarctic krill.

Fish meal is widely used as the main source of dietary protein for most commercially farmed fish, in part because fish meal provides a balanced amount of the essential amino acids.

According to a specific embodiment, the feed includes fish meal as a component.

According to a specific embodiment, the feed includes chicken meal as a component.

According to a specific embodiment, the feed includes soy meal as a component.

According to other embodiments, the protein is derived from surimi, ground fish meat, krill, gelatin, collagen, gluten, egg albumen.

According to a specific embodiment, "optimal dose of protein" is defined as the minimal amount of digestible protein required for best growth performance of a specific species at a certain quantity of digestible energy.

As used herein "a sub-optimal dose of protein" refers to an amount of protein that is lower than optimal.

TABLE 1

Minimal and recommended dietary protein levels (erode protein) for selected fish species

| Fish Species | | Recommended crude protein levels (%)[1] | | | | | Minimal crude protein (%)[2] | |
|---|---|---|---|---|---|---|---|---|
| | | <20 gr | 20-200 gr | 200-600 gr | 600-1500 gr | >1500 gr | juvenile | grower |
| Atlantic salmon | *Salmo salar* | 48 | 44 | 40 | 38 | 34 | 45 | 42-45 |
| Channel catfish | *Ictalurus punctatus* | 44 | 36 | 32 | 32 | 28 | 36-40 | 25-36 |
| Common carp | *Cyprinus carpio* | 45 | 38 | 32 | 28 | 28 | | 30-38 |
| Nile tilapia | *Oreochromis niloticus* | 40 | 34 | 30 | 28 | 26 | 30-35 | 30-32 |

TABLE 1-continued

Minimal and recommended dietary protein levels (erode protein) for selected fish species

| | | Recommended crude protein levels (%)[1] | | | | | Minimal crude protein (%)[2] | |
|---|---|---|---|---|---|---|---|---|
| Fish Species | | <20 gr | 20-200 gr | 200-600 gr | 600-1500 gr | >1500 gr | juvenile | grower |
| Pacific salmon | *Oncorhynchus* spp. | 55 | 45 | 40 | 38 | 38 | | |
| Rainbow trout | *Oncorhynchus mykiss* | 48 | 40 | 38 | 38 | 36 | 43 | 42 |
| European seabass | *Dicentrarchus labrax* | 55 | 50 | 45 | 45 | | 45-50 | 45 |
| Gilthead seabream | *Sparus aurata* | 50 | 45 | 40 | 40 | | 50-60 | 45-50 |
| Barramundi | *Lates calcarifer* | | | | | | | 40-50 |
| Flathead grey mullet | *Mugil cephalus* | | | | | | | 20-40 |
| Milkfish | *Chanos chanos* | | | | | | 40 | 30-40 |

[1]National Research Council (2011). Nutrient requirements of fish and shrimp.
[2]Food and Agriculture Organization of the United Nations

TABLE 1A

Nutrient Requirements of Freshwater Fish (dry-matter basis)[a, b]

| Item | Atlantic Salmon *Salmo salar* | Common Carp *Cyprinus carpio* | Rohu *Labeo rohita* | Tilapia *Oreochromis* spp. | Channel Catfish *Ictalurus punctatus* | Hybrid Striped Bass *Morone saxatilis* × *Morons chrysops* | Rainbow Trout *Oncorhynchus mykiss* | Pacific Salmon *Oncorhynchus* spp. |
|---|---|---|---|---|---|---|---|---|
| Typical Energy and Protein Concentrations[c] | | | | | | | | |
| Digestible energy (kcal/kg diet) | 4,400 | 3,200 | 3,200 | 3,400 | 3,000 | 4,000 | 4,200 | 4,200 |
| Digestible protein (%) | 36 | 32 | 32 | 29 | 29 | 36 | 38 | 40 |
| Nutrient Requirements | | | | | | | | |
| Amino acids | | | | | | | | |
| Arginine | 1.8 | 1.7 | 1.7 | 1.2 | 1.2 | 1.0 | 1.5 | 2.2 |
| Histidine | 0.8[d] | 0.5 | 0.9 | 1.0 | 0.6 | NT | 0.8 | 0.7 |
| Isoleucine | 1.1 | 1.0 | 1.0 | 1.0 | 0.8 | NT | 1.1 | 1.0 |
| Leucine | 1.5 | 1.4 | 1.5 | 1.9 | 1.3 | NT | 1.5 | 1.6 |
| Lysine | 2.4 | 2.2 | 2.3 | 1.6 | 1.6 | 1.6 | 2.4 | 2.2 |
| Methionine | 0.7 | 0.7 | 0.7 | 0.7 | 0.6 | 0.7 | 0.7 | 0.7 |
| Methionine + cysteine | 1.1 | 1.0 | 1.0 | 1.0 | 0.9 | 1.1 | 1.1 | 1.1 |
| Phenylalanine | 0.9 | 1.3 | 0.9 | 1.1 | 0.7 | 0.9 | 0.9 | 0.9 |
| Phenylalanine + tyrosine | 1.8 | 2.0 | 1.6 | 1.6 | 1.6 | NT | 1.8 | 1.8 |
| Threonine | 1.1 | 1.5 | 1.7 | 1.1 | 0.7 | 0.9 | 1.1 | 1.1 |
| Tryptophan | 0.3 | 0.3 | 0.4 | 0.3 | 0.2 | 0.3 | 0.3 | 0.3 |
| Valine | 1.2 | 1.4 | 1.5 | 1.5 | 0.8 | NT | 1.2 | 1.2 |
| Taurine | NR | NR | NT | NT | NR | NR | NR[e] | NT |
| Fatty acids (%) | | | | | | | | |
| 18:3n-3 | 1.0 | 0.5-0.1 | NT | NT | 1.0-2.0 | NR | 0.7-1.0 | 1.0 |
| n-3 LC-PUFA/ | 0.5-1.0 | R | NT | R | 0.5-0.75 | 0.5-0.1 | 0.4-0.5 | 1.0 |
| 18:2n-6 | NT | 0.1 | NT | 0.5-0.1 | NT | NT | 1.0 | 1.0 |
| Cholesterol (%) | NT | NT | NT | NT | NT | NT | NT | NT |
| Phospholipids (%) | NT (4.0-0.6)[g] | NT (2.0)[g] | NT | NT | NT | NT | NT (4.0-14.0)[g] | NT |
| Macrominerals (%) | | | | | | | | |
| Calcium | NR | 0.34 | NT | R/0.7[h] | R/0.45[h] | NR | NR | NR |
| Chlorine | NT | NT | NT | 0.15 | 0.17 | NT | NT | NT |
| Magnesium | 0.04 | 0.05 | NT | 0.06 | 0.04 | NT | 0.05 | NT |
| Phosphorus | 0.80 | 0.70 | NT | 0.40 | 0.33 | 0.50 | 0.70 | 0.60 |
| Potassium | NT | NT | NT | 0.20-0.30 | 0.26 | NT | NT | 0.80 |
| Sodium | NR | NT | NT | 0.15 | 0.06 | NT | NR | NT |

TABLE 1A-continued

Nutrient Requirements of Freshwater Fish (dry-matter basis)[a, b]

| Item | Atlantic Salmon *Salmo salar* | Common Carp *Cyprinus carpio* | Rohu *Labeo rohita* | Tilapia *Oreochromis* spp. | Channel Catfish *Ictalurus punctatus* | Hybrid Striped Bass *Morone saxatilis Morons chrysops* | Rainbow Trout *Oncorhynchus mykiss* | Pacific Salmon *Oncorhynchus* spp. |
|---|---|---|---|---|---|---|---|---|
| Microminerals | | | | | | | | |
| Copper | 5 | 3 | NT | 5 | 5 | NT | 3 | NT |
| Iodine | R | NT | NT | NT | 1.1 | NT | 1.1 | 1 |
| Iron | 30-60 | 150 | NT | 85 | 30 | NT | NT | NT |
| Manganese | 10 | 12 | NT | 7 | 2.4 | NT | 12 | NT |
| Selenium | NT | NT | NT | NT | 0.25 | 0.25 | 0.15 | R |
| Zinc | 37 | 15 | NT | 20 | 20 | 37 | 15 | NT |
| Fat-soluble vitamins | | | | | | | | |
| A (mg/kg) | NT | 1.2 | NT | 1.8 | 0.6 | 0.5 | 0.75 | R |
| D (μg/kg) | NT | NT | NT | 9 | 12.5 | NT | 40 | NR |
| E (mg/kg) | 60 | 100 | 132 | 60 | 50 | 28 | 50 | 50 |
| K (mg/kg) | <10 | NT | NT | NT | R | NT | R | R |
| Water-soluble vitamins (mg/kg) | | | | | | | | |
| Thiamin | NT | 0.5 | NT | NT | 1 | NT | 1 | 10 |
| Vitamin B6 | 5 | 6 | NT | 15 | 3 | NT | 3 | 6 |
| Pantothenic Acid | NT | 30 | NT | 10 | 15 | 25 | 20 | 20 |
| Niacin | NT | 28 | NT | 26 | 14 | NT | 10 | 150 |
| Biotin | NT | 1 | NT | 0.06 | R | NT | 0.15 | 1 |
| Vitamin B12 | NT | NR | NT | NR | R | NT | R | 0.02 |
| Choline | NT | 1,500 | NT | 1,100 | 400 | 500 | 800 | 800 |
| Myoinositol | NT | 400 | NT | 400 | NR | NR | 300 | 300 |
| Vitamin C | 20 | 45 | NT | 2.0 | 15 | 22 | 20 | NT |

These requirements have been determined with highly purified ingredients in which the nutrients are highly digestible, thereof the values presented represent near 100% bioavailability.
R.Required in diet but quantity not determined, NR, not required under practical conditions (e.g., diets containing ingredients from marine and land animals, proteins and fish oil and water of at least medium hardness). Nt-not tested. Typical digestible energy and digestible crude protein concentrations (digestible N×6.25) in commercial diets.
Young Atlantic salmon undergoing rapid growth after transfer to seawater appear to require up to 1.4% dietary histidine to prevent ocular pathology and Lateral cataracts).

Values in parentheses represent requirements reported for larval/early juvenile stages.

Dietary requirement in the absence of waterborne calcium.

Conversion factors for fat-soluble vitamins are as follows: 10,000 IU=3,000 μg vitamin A (retinol), 1 IU=0.025 μg vitamin D (cholecalciferol).

Diet without phospholipids. Please refer to Chapter 9, Vitamins, for a full discussion of choline, inositol, and phospholipids.

As L-ascorbyl-2-monophate or L-ascorbyl-2-polyphosphate.

TABLE 2

List of animal species used in aquaculture

| Common name | Scientific name | Common name | Scientific name | Common name | Scientific name | Common name | Scientific name | Common name | Scientific name |
|---|---|---|---|---|---|---|---|---|---|
| Siberian sturgeon | Acipenser baeri | Paco | Piaractus mesopotamicus | Bigmouth buffalo | Ictiobus cyprinellus | Common snook | Centropomus undecimalis | Java barb | Puntius javanicus |
| Sterlet sturgeon | Acipenser ruthenus | Black bullhead | Ictalurus melas | Bocachico | Ichthyoelephas humeralis | Barramundi | Lates calcarifer | Roach | Rutilus |
| Starry sturgeon | Acipenser stellatus | Channel catfish | Ictalurus punctatus | Bocachico | Prochilodus reticulatus | Nile perch | Lates niloticus | Tench | Tinca |
| White sturgeon | Acipenser transmontanus | Bagrid catfish | Chrysichthys nigrodigitatus | Dorada | Brycon moorei | Murray cod | Maccullochella peeli | Pond loach | Misgurnus anguillicaudatus |
| Beluga | Huso | Wels catfish | Siluris glaniiis | Cachama | Colossoma macropomum | Golden perch | Macquaria ambigua | Climbing perch | Anabas testudineus |
| Arapaima | Arapaima gigas | Pangas catfish | Pangasius | Cachama blanca | Piaractus brachypomus | Gilthead seabream | Sparus aurata | Snakehead | Channa argus |
| African bonytongue | Heterotis niloticus | Striped catfish | Pangasius sutchii | Striped bass | Morone saxatilis | Red drum | Sciaenops ocellatus | Turbot | Psetta maxima |
| European eel | Anguilla | Mudfish | Clarias anguillaris | European seabass | Dicentrarchus labrax | Green terror | Aequidens rivulatus | Lake trout | Salvelinus namaycush |
| Japanese eel | Anguilla japonica | Philippine catfish | Clarias batrachus | Hong Kong grouper | Epinephelus akaara | Blackbelt cichlid | Cichlasoma maculicauda | Atlantic cod | Gadus morhua |
| American eel | Anguilla rostrata | Hong Kong catfish | Clarias fuscus | Areolate grouper | Epinephelus areolatus | Jaguar guapote | Cichlasoma managuense | Pejerrey | Odontesthes bonariensis |
| Milkfish | Chanos | North African catfish | Clarias gariepinus | Greasy grouper | Epinephelus tauvina | Mexican mojarra | Cichlasoma urophthalmus | Lai | Monopterus albus |
| Freshwater bream | Abramis brama | Bighead catfish | Clarias macrocephalus | Spotted coralgrouper | Plectropomus maculatus | Pearlspot | Etroplus suratensis | Snakeskin gourami | Trichogaster pectoralis |
| Asp | Aspius | African catfish | Heterobranchus bidorsalis | Silver perch | Bidyanus | Three spotted tilapia | Oreochromis andersonii | Indonesian snakehead | Channa micropeltes |
| Catla | Catla | Sampa | Heterobranchus longifilis | Largemouth black bass | Micropterus salmoides | Blue tilapia | Oreochromis aureus | Bastard halibut | Paralichthys olivaceus |
| Goldfish | Carassius auratus | South American catfish | Rhamdia sapo | European perch | Perca fluviatilis | Longfin tilapia | Oreochromis macrochir | Goldlined spinefoot | Siganus guttatus |
| Crucian carp | Carassius | Atipa | Hoplosternum littorale | Pike-perch | Stizostedion lucioperca | Mozambique tilapia | Oreochromis mossambicus | Marbled spinefoot | Siganus rivulatus |
| Mud carp | Cirrhinus molitorella | Northern pike | Esox lucius | Bluefish | Pomatomus saltatrix | Nile tilapia | Oreochromis niloticus | Southern bluefin tuna | Thunnus maccoyii |
| Mrigal carp | Cirrhinus mrigala | Ayu sweetfish | Plecoglossus altvelis | Greater amberjack | Seriola dumerili | Tilapia | Oreochromis spilurus | Northern bluefin tuna | Thunnus thynnus |
| Grass carp | Ctenopharyngodon idellus | Vendace | Coregonus albula | Japanese amberjack | Seriola quinqueradiata | Wami tilapia | Oreochromis urolepis | Kissing gourami | Helostoma temmincki |
| Common carp | Cyprinus carpio | Whitefish | Coregonus lavaretus | Snubnose pompano | Trachinotus blochii | Blackchin tilapia | Sarotherodon melanotheron | Spotted snakehead | Channa punctatus |

TABLE 2-continued

List of animal species used in aquaculture

| Common name | Scientific name | Common name | Scientific name | Common name | Scientific name | Common name | Scientific name | Common name | Scientific name |
|---|---|---|---|---|---|---|---|---|---|
| Silver carp | Hypophthalmichthys molitrix | Pink salmon | Oncorhynchus gorbuscha | Florida pompano | Trachinotus carolinus | Tilapia | Tilapia guineensis | Common sole | Solea vulgaris |
| Bighead carp | Hypophthalmichthys nobilis | Chum salmon | Oncorhynchus keta | Palometa pompano | Trachinotus goodei | Redbreast tilapia | Tilapia rendalli | Lebranche mullet | Mugil liza |
| Orangefin labeo | Labeo calbasu | Coho salmon | Oncorhynchus kisutch | Japanese jack mackerel | Trachurus japonicus | Redbelly tilapia | Tilapia zillii | Pacific fat sleeper | Dormitator latifrons |
| Roho labeo | Labeo rohita | Masu salmon | Oncorhynchus masou | Mangrove red snapper | Lutjanus argentimaculatus | Golden grey mullet | Liza aurata | Marble goby | Oxyeleotris marmorata |
| Hoven's carp | Leptobarbus hoeveni | Rainbow trout | Oncorhynchus mykiss | Yellowtail snapper | Ocyurus chrysurus | Largescale mullet | Liza macrolepis | White-spotted spinefoot | Siganus canaliculatus |
| Wuchang bream | Megalobrama amblycephala | Sockeye salmon | Oncorhynchus nerka | Dark seabream | Acanthopagrus schlegeli | Gold-spot mullet | Liza parsia | Giant gourami | Osphronemus goramy |
| Black carp | Mylopharyngodon piceus | Chinook salmon | Oncorhynchus tshawytscha | White seabream | Diplodus sargus | Thinlip grey mullet | Liza ramada | Striped snakehead | Channa striata |
| Golden shiner | Notemigonus crysoleucas | Atlantic salmon | Salmo salar | Crimson seabream | Evynnis japonica | Leaping mullet | Liza saliens | | |
| Nilem carp | Osteochilus hasselti | Sea trout | Salmo trutta | Red seabream | Pagrus major | Tade mullet | Liza tade | | |
| White amur bream | Parabramis pekinensis | Arctic char | Salvelinus alpinus | Red porgy | Pagrus | Flathead grey mullet | Mugil cephalus | | |
| Thai silver barb | Puntius gonionotus | Brook trout | Salvelinus fontinalis | Gold lined seabream | Rhabdosargus sarba | White mullet | Mugil curema | | |

Source: FAO corporate document repository, List of animal species used in aquaculture The optimal dose of protein is typically determined empirically per species. It is affected by various factors including the developmental stage of the treated species, the temperature of the culture and the source of protein in the diet. Protein absorption and growth parameters can be determined using methods, which are well known to the skilled artisan. Some are described in details in the Examples section which follows.

References to the nutritional requirements of species of interest are published periodically by the regulatory agencies e.g., FAO, NRC. Current requirements are provided herein in Tables 1, 1A above.

According to a specific embodiment, the feed comprises at least 15% by weight lower protein concentration than that optimal for the species at a predetermined developmental stage.

According to a specific embodiment, the feed comprises at least 20% by weight lower protein concentration than that optimal for the species at a predetermined developmental stage.

According to a specific embodiment, the feed comprises at least 25% by weight lower protein concentration than that optimal for the species at a predetermined developmental stage.

According to a specific embodiment, the feed comprises at least 30% by weight lower protein concentration than that optimal for the species at a predetermined developmental stage.

According to a specific embodiment, the feed comprises at least 35% by weight lower protein concentration than that optimal for the species at a predetermined developmental stage.

According to a specific embodiment, the feed comprises at least 40% by weight lower protein concentration than that optimal for the species at a predetermined developmental stage.

According to a specific embodiment, the feed comprises at least 45% by weight lower protein concentration than that optimal for the species at a predetermined developmental stage.

According to a specific embodiment, the feed comprises at least 50% by weight lower protein concentration than that optimal for the species at a predetermined developmental stage.

According to a specific embodiment, the feed comprises at least 55% by weight lower protein concentration than that optimal for the species at a predetermined developmental stage.

According to a specific embodiment, the feed comprises at least 60% by weight lower protein concentration than that optimal for the species at a predetermined developmental stage.

According to a specific embodiment, the feed comprises at least 65% by weight lower protein concentration than that optimal for the species at a predetermined developmental stage.

According to a specific embodiment, the feed comprises at least 70% by weight lower protein concentration than that optimal for the species at a predetermined developmental stage.

According to a specific embodiment, the feed comprises at least 75% by weight lower protein concentration than that optimal for the species at a predetermined developmental stage.

According to a specific embodiment, the feed comprises at least 80% by weight lower protein concentration than that optimal for the species at a predetermined developmental stage.

According to a specific embodiment, the feed comprises at least 85% by weight lower protein concentration than that optimal for the species at a predetermined developmental stage.

According to a specific embodiment, the feed comprises at least 90% by weight lower protein concentration than that optimal for the species at a predetermined developmental stage.

According to a specific embodiment, the feed comprises at least 15% by weight lower protein concentration than that optimal according to the reference (e.g., Tables 1 and 1A above).

According to a specific embodiment, the feed comprises at least 20% by weight lower protein concentration than that optimal according to the reference (e.g., Tables 1 and 1A above).

According to a specific embodiment, the feed comprises at least 25% by weight lower protein concentration than that optimal according to the reference (e.g., Tables 1 and 1A above).

According to a specific embodiment, the feed comprises at least 30% by weight lower protein concentration than that optimal according to the reference (e.g., Tables 1 and 1A above).

According to a specific embodiment, the feed comprises at least 35% by weight lower protein concentration than that optimal according to the reference (e.g., Tables 1 and 1A above).

According to a specific embodiment, the feed comprises at least 40% by weight lower protein concentration than that optimal according to the reference (e.g., Tables 1 and 1A above).

According to a specific embodiment, the feed comprises at least 45% by weight lower protein concentration than that optimal according to the reference (e.g., Tables 1 and 1A above).

According to a specific embodiment, the feed comprises at least 50% by weight lower protein concentration than that optimal according to the reference (e.g., Tables 1 and 1A above).

According to a specific embodiment, the feed comprises at least 55% by weight lower protein concentration than that optimal according to the reference (e.g., Tables 1 and 1A above).

According to a specific embodiment, the feed comprises at least 60% by weight lower protein concentration than that optimal according to the reference (e.g., Tables 1 and 1A above).

According to a specific embodiment, the feed comprises at least 65% by weight lower protein concentration than that optimal according to the reference (e.g., Tables 1 and 1A above).

According to a specific embodiment, the feed comprises at least 70% by weight lower protein concentration than that optimal according to the reference (e.g., Tables 1 and 1A above).

According to a specific embodiment, the feed comprises at least 75% by weight lower protein concentration than that optimal according to the reference (e.g., Tables 1 and 1A above).

According to a specific embodiment, the feed comprises at least 80% by weight lower protein concentration than that optimal according to the reference (e.g., Tables 1 and 1A above).

According to a specific embodiment, the feed comprises at least 85% by weight lower protein concentration than that optimal according to the reference (e.g., Tables 1 and 1A above).

According to a specific embodiment, the feed comprises at least 90% by weight lower protein concentration than that optimal according to the reference (e.g., Tables 1 and 1A above).

According to a specific embodiment, the feed comprises not more than 45% by weight protein (e.g., 10%-45%, 10%-40%, 10%-35%, 10%-30%, 10%-25%, 10%-20%, 10%-15% by weight).

According to a specific embodiment, the feed comprises not more than 40% by weight protein.

According to a specific embodiment, the feed comprises not more than 35% by weight protein.

According to a specific embodiment, the feed comprises not more than 30% by weight protein.

According to a specific embodiment, the feed comprises not more than 25% by weight protein.

According to a specific embodiment, the feed comprises not more than 20% by weight protein.

According to a specific embodiment, the feed comprises not more than 10% by weight protein.

As used herein "butyric acid" also known as butanoic acid, abbreviated BTA, is a carboxylic acid with the structural formula $CH_3CH_2CH_2$—COOH. Salts and esters of butyric acid are known as butyrates or butanoates. Butyric acid is naturally found in milk, especially goat, sheep and buffalo milk, butter, parmesan cheese, and as a product of anaerobic fermentation (including in the colon and as body odor). According to a specific embodiment, the butyric acid or salt thereof is synthetic or a product of fermentation.

Examples of salts of butyric acid include, but are not limited to, sodium butyrate, ethyl butyrate, methyl butyrate, pentyl butyrate and a combination of same.

According to a specific embodiment, the effective amount of butyric acid or salt thereof comprises 0.01-5% by weight.

According to a specific embodiment, the effective amount comprises 0.01-2% by weight butyric acid or salt thereof.

According to a specific embodiment, the effective amount comprises 0.01-1.5% by weight butyric acid or salt thereof.

According to a specific embodiment, the effective amount comprises 0.01-1% by weight butyric acid or salt thereof.

According to a specific embodiment, the effective amount comprises 0.01-0.5% by weight butyric acid or salt thereof.

According to a specific embodiment, the effective amount comprises 0.01-0.1% by weight butyric acid or salt thereof.

According to a specific embodiment, the effective amount comprises 0.1-1.6% by weight butyric acid or salt thereof.

As used herein "Traurine" refers to the organic compound 2-aminoethanesulfonic acid.

Examples of taurine salts include, but are not limited to sodium taurate and magnesium taurate, potassium taurate and iron taurate.

According to a specific embodiment, the effective amount of taurine or salt thereof comprises 0.1-5% by weight.

According to a specific embodiment, the effective amount of taurine or salt thereof comprises 0.1-4% by weight.

According to a specific embodiment, the effective amount of taurine or salt thereof comprises 0.1-3% by weight.

According to a specific embodiment, the effective amount of taurine or salt thereof comprises 0.1-2% by weight.

According to a specific embodiment, the effective amount of taurine or salt thereof comprises 1-1.5% by weight.

According to a specific embodiment, the effective amount of taurine or salt thereof comprises 1.5% by weight.

According to a specific embodiment, the effective amount of taurine or salt thereof comprises 0.5-1.5% by weight.

According to a specific embodiment, the effective amount of taurine or salt thereof comprises 0.6-1.5% by weight.

According to a specific embodiment, the effective amount of taurine or salt thereof comprises 0.7-1.5% by weight.

According to a specific embodiment, the effective amount of taurine or salt thereof comprises 0.8-1.5% by weight.

According to a specific embodiment, the effective amount of taurine or salt thereof comprises 0.9-1.5% by weight.

The compositions (feeds) as described herein may comprise an effective amount (e.g., to reduce FCR and increase RWG, SGR, food and protein utilization efficiency) of butyric acid or salt thereof, taurine or salt thereof or a combination of same. According to a specific embodiment, the combination supports a synergistic effectivity (e.g., in reducing FCR and increasing RWG, SGR, food and protein utilization efficiency).

According to a specific embodiment, the feed comprises taurine or salt thereof at an effective amount which synergizes with said butyric acid to facilitate reducing FCR.

According to a specific embodiment, the increase in RWG is by at least 5%, 10%, 15% or even 20%.

According to a specific embodiment, the increase in SGR is by at least 0.05%, 0.1%, 1.15% or 0.2%.

According to a specific embodiment, the increase in SGR is by at least 0.025%, 0.05%, 0.1%, 0.15% or 0.2%.

According to a specific embodiment, the decrease in FCR is by at least 0.05, 0.1, 0.15 or 0.2.

In one embodiment, the feed may comprise further components commonly used in animal feeds. For example, attractants, anti-oxidants, immunostimulants, enzymes, pigments, organic acids, prebiotics, probiotics, feeding stimulants, antibiotics, hormones and binders and combinations thereof.

In one embodiment, the feed may comprise fishmeal, fish oil, poultry meal, poultry by-product meal, feather meal, meat meal, blood meal, bone meal, rapeseed, corn gluten, linseed, poultry oil, wheat and soy and their derivatives, lupin meal, pea protein, sunflower meal, faba bean meal, canola oil, algae, micro algae, seaweed, periphyton and agricultural or animal industry by-products.

Exemplary compositions are provided in Tables 3-5 in the Examples section, which follows.

Process for the production can be any known in the art, dependent on the ingredients used and formulation According to a specific embodiment, the process involves: (i) mixing butyric acid, taurine, salts thereof or combinations of same with other suitable feed ingredients (as described above, also as encapsulated additives) (ii) homogenising the mixture and (iii) processing the homogenised mixture into a suitable form, as described above.

According to another more preferred embodiment, the taurine, butyrate or salts thereof with or without encapsulation can be added to a pellet after the extrusion stage by coating or by vacuum coating on the extruded pellets.

In one embodiment, in step (iii), the homogenised mixture is pelletized into a form suitable for feeding fish or crustaceous e.g. shrimp e.g., a sinking pellet.

In another embodiment, in step (iii), the homogenised mixture is extruded into flakes and is suitable for feeding fish.

Accordingly, there is provided an aquaculture feed identified for feeding a species of interest, the feed comprising at least 15% by weight (or any other measure listed above, each of which is intended to cover a separate embodiment, throughout) lower protein concentration than that optimal for the species at a predetermined developmental stage, and an effective amount of butyric acid or salt thereof, said effective amount facilitating reducing feed conversion ratio (FCR).

According to a specific embodiment, the feed can be used as the sole food source throughout the lifecycle of the fish (from juvenile to adult) or be combined with one or more different aquaculture feed over time, which are formulated to meet the changing nutrient requirements needed during different stages of growth (Handbook of Salmon Farming; Stead and Laird (eds) (2002) Praxis Publishing Ltd., Chichester, UK). The present aquaculture feed compositions may be fed to animals to support their growth by any method of aquaculture known by one skilled in the art (Food for Thought: the Use of Marine Resources in Fish Feed, Editor: Tveferaas, head of conservation, WWF-Norway, Report #02/03 (February 2003)).

As used herein "providing" refers to the act of feeding which can be by dispensing.

According to a specific embodiment, providing is effected not more than once in 24 hours.

According to a specific embodiment, providing is effected at least once in 24 hours (e.g., 2, 3, 4, 5)

According to a specific embodiment, providing is effected once a week.

According to a specific embodiment, providing is effected once two weeks.

According to a specific embodiment, providing is effected once three weeks.

According to a specific embodiment, providing is effected every 1-3 weeks.

According to a specific embodiment, providing is effected every 2-3 weeks.

According to a specific embodiment, providing is effected every 4-5 weeks.

According to a specific embodiment, providing is effected every 5-6 weeks.

According to a specific embodiment, providing is effected every 6-7 weeks.

According to a specific embodiment, providing is effected every 7-8 weeks.

According to a specific embodiment, providing is effected every 8-10 weeks.

According to a specific embodiment, providing is effected every 8-12 weeks.

Once the aquaculture animals reach an appropriate size, the crop (fish, crustaceans) is harvested, processed to meet consumer requirements, and can be shipped to market, generally arriving within hours of leaving the water. The term "aquaculture meat product" refers to food products intended for human consumption containing at least a portion of meat from an aquaculture product as defined above. An aquaculture meat product may be, for example, a whole fish or a filet cut from a fish, each of which may be consumed as food and typically comprise the DNA of the aquatic animal grown according to some embodiments of the invention. However, the product may also consist of a purified metabolite of the aquaculture animal such as asthaxantins or oil or fatty acids such as omega-3, or part of the fish such as the gonad.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate the invention in a non-limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Flames, B. D., and Higgins S. J., eds. (1985); "Transcription and Translation" Flames, B. D., and Higgins S. J., Eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

EXPERIMENTAL PROCEDURES

Butyrate and Taurine Effect on White Groupers Growth

White grouper (*Epinephelus aeneus*) at an initial weight of 41.78±0.74 g (mean±SEM) were stocked in 80 L cylindrical plastic tanks at a density of 30 fish per tank with 4 tank replicates for each one of four dietary treatments (a total of 16 tanks). Fish were kept under open circulation of filtered, UV treated ambient sea water (40‰) at a temperature range of 22.1-23.2° C. and a natural photoperiod of about 12 h light: 12 h dark with light intensity of 200-400 lux (Hioki Lux Hi Tester 3421, Japan). Levels of dissolved oxygen were above 5.33 mg $L^{-1}$ (Oxyguard Handy Polaris, Farum, Denmark).

Fish were fed to apparent satiety, daily with four different experimental diets which included a control diet and diets supplemented with 1.5% dietary taurine (+T), sodium butyrate (Sigma Aldrich, USA) at a level of 0.1% (+B) and both taurine and butyrate (+TB; Table 3). The trial was conducted for 12 weeks in which fish were weighed and counted every two weeks in order to assess their growth and survival. At the end of trial growth parameters were calculated and 8 fish from each group were sacrificed for gene expression, taurine content, body composition and histological analyses. In this procedure fish were euthanized with an overdose of MS2-22 (Sigma Aldrich, USA) followed by a swift decapitation and then dissected for the removal of their gastrointestinal tract and internal organs. Samples of liver and muscle removed and stored at −20° C. and samples of the proximal intestine (approx. 1 cm) were frozen immediately and stored at −80° C. until molecular analysis or fixed in 10% neutral buffered formalin (NBF) and stored at room temperature until processed for histology. The remaining fish carcass was stored at −20° C. and analyzed for body composition.

TABLE 3

Composition (g $kg^{-1}$ dry weight) of the experimental diets used in the trial for characterizing the effect of dietary butyrate and taurine on white groupers growth.

| Ingredients | Diets | | | |
|---|---|---|---|---|
| | Control | +T | +B | +TB |
| Fish meal | 240 | 240 | 240 | 240 |
| Soy meal | 170 | 170 | 170 | 170 |
| Poultry meal | 150 | 150 | 150 | 150 |
| Soy protein | 90 | 90 | 90 | 90 |
| Fish oil | 60 | 60 | 60 | 60 |
| Taurine | 0 | 15 | 0 | 15 |
| Corn gluten | 50 | 50 | 50 | 50 |
| Whole wheat | 146.2 | 131.2 | 145.2 | 130.2 |
| Wheat gluten | 60 | 60 | 60 | 60 |
| DCP | 5 | 5 | 5 | 5 |
| Choline chloride | 10 | 10 | 10 | 10 |
| Lysine | 5 | 5 | 5 | 5 |
| Methionine | 3 | 3 | 3 | 3 |
| Vitamin mix | 10 | 10 | 10 | 10 |
| Vitamin C | 0.8 | 0.8 | 0.8 | 0.8 |
| Sodium butyrate | 0 | 0 | 1 | 1 |

Analysis of Taurine in Fish Tissues

Liver and muscle tissue samples were freeze dried (Freeze dryer FD-1C-80, Boyikang, China). About 2 to 5 mg of each sample were first hydrolyzed (1 ml of 0.1MHCL and homogenized for 1.5 min on ice) and then centrifuged (13,000 rpm at 4° C. for 20 min). A measured amount of the supernatant from each sample was transferred into 10 ml glass test tubes. Further preparation and analysis of samples were conducted according to the procedures described by (Orth, 2001), using reversed-phase HPLC (Varian HPLC 325-410 nm, Walnut Creek, Calif., USA) with gradient elution separation in a 150×4.6 mm Acclaim™ 120 C18 5 μm column (Thermo Scientific, USA). An adjustment in the gradient elution program was made in order to optimize separation and better detect taurine in the sample.

Histological Analysis of Proximal Intestine

Intestinal samples were processed according to standard histological protocol in which samples were dehydrated and cleared in K-Clear (Kaltek, Italy) before being embedded in Paraplast (Sigma Aldrich, USA) and cross sectioned at a thickness of 5 μm (RM2245 microtome, Leica, Germany). Slides containing grouper intestinal cross sections (in triplicates) on them were stained with hematoxylin-eosin (HE)

and photographed under a stereo zoom microscope (Axio Zoom.V16, Zeiss, Germany) and the inner and outer perimeter (mm) of the intestinal sections were measured using ImageJ software (imagej(dot)nih(dot)gov/ij/). For each section the inner perimeter (mm) of the intestine with the crypts and villi was normalized against the outer perimeter (mm). The calculated ratio (inner perimeter/outer perimeter) for each section was then averaged for each slide/sample and analyzed for differences between treatments.

Butyrate and Taurine Effect on Gilthead Seabream (*Sparus aurata*)

The experimental set up consisted of 200 L circular tanks in a flow through, filtered (10 µm) ambient seawater (40‰) system under a natural photoperiod of about 12 h/12 h (dark/light) where the water temperature ranged between 24.8-25.4° C. Experimental diets were offered to the fish twice a day (9:00; 14:00).

Characterizing PepT1 Pattern of Expression and Screening for the Effect of Dietary Butyrate on Target Genes Fish having an average weight of 14.49±0.2 g (mean±SEM) were stocked in 15 tanks at a density of 30 fish tank$^{-1}$ with 5 replicate tanks (assigned as A-E) dietary treatment$^{-1}$. During the 10 day trial, fish were offered the experimental diets (Table 4) with 1% taurine and with 0 and 0.8% of sodium butyrate (Sigma Aldrich, USA). After 10 days, 6 fish from each treatment were sampled for their proximal intestinal total RNA at hourly intervals in the following manner: 07:30 (A), 08:30 (B), 09:30 (C), 10:30 (D), 11:30 (E), 13:30 (A), 14:30 (B) and 15:30 (C).

TABLE 4

Composition (g kg−1 dry weight) of the experimental diets used in the trials for characterizing PepT1 pattern of expression and screening for the effect of dietary butyrate on target genes.

| | Diets | | |
|---|---|---|---|
| Ingredients | 0% butyrate | 0.8% butyrate | 1.6% butyrate |
| Fish meal | 220 | 220 | 220 |
| Soy meal | 90 | 90 | 90 |
| Poultry meal | 120 | 120 | 120 |
| Soy protein | 100 | 100 | 100 |
| Fish oil | 91.8 | 91.8 | 91.8 |
| Taurine | 10 | 10 | 10 |
| Corn gluten | 90 | 90 | 90 |
| Whole wheat | 180.1 | 170.3 | 160.5 |
| Wheat gluten | 56.8 | 58.6 | 60.4 |
| DCP | 22.5 | 22.5 | 22.5 |
| Choline chloride | 5 | 5 | 5 |
| Lysine | 5 | 5 | 5 |
| Methionine | 3 | 3 | 3 |
| Vitamin mix | 5 | 5 | 5 |
| Vitamin C | 0.8 | 0.8 | 0.8 |
| Sodium butyrate | 0 | 8 | 16 |

For determining whether (1) an effect of dietary butyrate on PepT1 transcriptional level is sustained after its supplementation has stopped and (2) to investigate an effect of dietary butyrate on Cdx1b expression. To this end another study was carried out. In this trial, fish having an average weight of 27.14±0.47 g (mean±SEM) were stocked at a density of 30 fish per tank with two replicate tanks per treatment. Fish were fed with the experimental diets (Table 4) including 1% taurine and 0, 0.8 and 1.6% of sodium butyrate for 8 days before its supplementation was stopped and all of the dietary groups started receiving the 0% sodium butyrate containing diet. Four fish from each tank (8 fish per dietary treatment) were sampled for their proximal intestine total RNA at days 9, 12 and 15 of the trial.

Taurine and Butyrate Effect on Fish Fed Low Protein Level Diet

Juvenile gilthead sea bream having an initial weight of 5.57±0.02 g (mean±SEM) were used to test the combined effect of protein level and butyrate supplementation on fish performance in a 20 tank system. The fish were stocked at a density of 30 fish tank$^{-1}$ which allowed the testing of the 4 treatments in 5 tank replicates (assigned as A-E) treatment$^{-1}$. Dietary treatments consisted of two different dietary protein levels of 50 or 35 percent crude protein (CP) including 1% taurine with or without 1.6% of sodium butyrate (Table 5; 50% CP, 35% CP, 50% CP+B, 35% CP+B, respectively). Diets were iso-energetic, and included the same ratio of fishmeal/soymeal in order to reduce variable digestibility and dietary amino acid profiles (Table 5).

During the 13 week trial, fish were weighed approximately every two weeks. The data were used to calculate growth rates and to adjust the daily rations of feed. At the end of the trial, 6 fish from each tank were sampled for calculating gut index and extracting their proximal intestine total RNA. Two other fish were sampled for histology and body composition. All sampling procedures were performed as described.

TABLE 5

Composition (g kg−1 dry weight) arid proximate analyses of the experimental diets used in the trial for the defining the effect of dietary protein level and the addition of taurine and butyrate on juvenile sea bream.

| | Diets | | | |
|---|---|---|---|---|
| | 50% CP | 35% CP | 50% CP + B | 35% CP + B |
| Ingredients | | | | |
| Fish meal | 622.5 | 445.1 | 622.5 | 445.1 |
| Soy meal | 198.3 | 140 | 198.3 | 140 |
| Cellulose | 45.6 | 70.1 | 45.6 | 70.1 |
| Fish oil | 84.8 | 137.5 | 84.8 | 137.5 |
| Taurine | 10 | 10 | 10 | 10 |
| Starch | 20 | 168.5 | 4 | 152.5 |
| DCP | 0 | 10 | 0 | 10 |
| Choline chloride | 5 | 5 | 5 | 5 |
| Lysine | 5 | 5 | 5 | 5 |
| Methionine | 3 | 3 | 3 | 3 |
| Vitamin mix | 5 | 5 | 5 | 5 |
| Vitamin C | 0.8 | 0.8 | 0.8 | 0.8 |
| Sodium butyrate | 0 | 0 | 16 | 16 |
| Proximate analyses | | | | |
| Crude protein (%) | 49.24 | 36.71 | 48.82 | 36.66 |
| Lipid (%) | 17.67 | 19.55 | 17.66 | 19.62 |
| Ash (%) | 11.08 | 10 | 12.16 | 10.86 |
| Energy (cal g$^{-1}$) | 4974 | 5040 | 4949 | 5084 |

Sampling Procedures

Fish were euthanized with an overdose of MS2-22 (Sigma Aldrich, USA) followed by a swift decapitation and then dissected for the removal of their gastrointestinal tract. For total RNA, the 1$^{st}$ segment of the proximal intestine (approx. 1 cm) was cut, immediately frozen and stored at −80° C.

until RNA extraction. For histology, pieces of the proximal intestine (approx. 0.6 cm) were sampled, placed in 15 ml Falcon tubes containing 10% neutral buffered formalin (NBF) and stored at room temperature until processed. For immunohistochemistry (IHC-P) staining, pieces of proximal intestine (approx. 0.6 cm) were sampled, placed in 1.7 ml microcentrifuge tubes containing 4% paraformaldehyde (PFA) and stored at 4° C. for overnight fixation. After fixation, the intestinal samples were rinsed twice and washed three times (10 min each) with PBST 0.8% (PBS with 0.8% Triton x-100, Sigma Aldrich, USA). Following this, the samples were gradually dehydrated by one 5 min wash with 50% methanol in PBST followed by three more washings with 100% methanol and stored in 100% methanol at −20° C. until carrying out the staining procedure. After the removal of the gastrointestinal tract, the remaining carcasses of sampled fish were put into nylon bags and stored at −20° C. until proximate analysis. In order to calculate the gut index (GI), fish were weighed prior to the removal of their gastrointestinal tract. The intestines were separated from the stomach and pyloric caeca and then aligned, by forceps, against a ruler for measuring their length (mm). For each fish, gut index was calculated using the following formula: Gut index=100×Body weight (g)/(intestine length (mm))$^3$.

Gene Expression Analysis

Total RNA Extraction and cDNA Synthesis

Total RNA extraction from samples of the proximal intestine was carried out using BioTri reagent (Biolab, Israel) according to the manufacturer's instructions. For determining total RNA quality and concentration, 2 μl from each sample diluted with 18 μl of DEPC treated water (1:10) were loaded onto a 384 well microplate (Greiner Bio-One, Austria). In each sample the 260/280 ratio, 260/230 ratio and RNA concentration were obtained by plate reader and Gen5 software (Synergy HT, BioTek, USA). For each RNA extraction procedure, the integrity of the extracted RNA was evaluated by electrophoresis on 1.2% agarose gel stained with GelRed (Biotium, USA). A volume of 5 μl from 6 randomly selected RNA samples was loaded onto the gel with RNA gel loading dye (Thermo Scientific, USA) and RNA fragments were separated for detection of intact bands representing the 28S and 18S rRNA. Prior to cDNA synthesis, 2 μg from each RNA sample were treated with DNase I (Ambion, USA) for the removal of traces of genomic DNA. 1 μg from DNase treated samples was reverse transcribed to cDNA (qScript™ cDNA Synthesis, Quanta Bio-Sciences, USA).

Amplifying and Sequencing of Target Genes in the Gilthead Sea Bream

The designing of a real-time qPCR assay for CCK and Cdx1b transcripts, which their sequence in the sea bream was unknown, began with performing a nucleotide blast search (blast(dot)ncbi(dot)nlm(dot)nih(dot)gov/Blast(dot)cgi) for finding orthologues in other fish/vertebrate species with a level of similarity. A multiple sequence alignment (MSA) of selected coding (mRNA) sequences was performed (Clustal Omega, www(dot)ebi(dot)ac(dot)uk/Tools/msa/clustalo) for of detecting conserved areas within the sequences. Conserved areas within the sequence served as a template for designing cross-species specific PCR primers (Table 6) which were used to amplify fragments from the sea bream orthologue coding sequence. PCR products have been estimated for their size by electrophoresis on 1.8% agarose gel stained with GelRed (Biotium, USA) and then sent for sequencing (Hy Laboratories Ltd.). The identity of the sequenced data was further validated by performing additional MSA's (Clusta Omega) including the sequenced data and other orthologues as well as calculating pairwise sequence identity (SIAS, imed(dot)med(dot)ucm(dot)es/Tools/sias(dot)html).

For each amplification effort, specific primers for gilthead sea bream 18S rRNA (accession no. AY993930.1; Table 6) served as a positive control.

PCR

For amplification by PCR, 150 ng of template cDNA was transferred to PCR 0.2 ml tubes with GoTaq® Green Master Mix PCR kit (Promega, USA), and specific primers (Table 6). PCR amplification (TPersonal Thermocycler, Biometra, Germany) initiated with 2 min at 95° C. followed by 30 cycles of 30 sec at 95° C., 45 sec at $T_{annealing}$ (was set according to the $T_m$ of the primers) and 1 min at 72° C. A 5 min final extension stage at 72° C. was added according to the manufacture's recommendations.

Real-Time qPCR

Specific real-time PCR primers (Table 6) were designed for amplifying the sea bream PepT1 (accession no. GU733710.1), PCNA (accession no. CX734891.1), CCK, Cdx1b and β-actin (accession no. AY362763.1) transcripts. Quantification of target gene transcripts of different treatments was achieved by PCR reaction mix (10 μl) containing SYBR Green dye (Quanta, Perfecta; SYBR Green FastMix, Low ROX; 95074-012), template cDNA and 500 nM of target specific primers in a quantitative PCR system (Applied Biosystems, 7500 Fast Real Time PCR System). The relative quantity of the target transcripts was determined using ΔΔCT method (Livak and Schmittgen, 2001) in which the CT value of each one of the target genes compared against the CT value of sea bream β-actin as the reference gene.

TABLE 6

Sequences of the primers used for PCR and real-time PCR.

| Primer | Sequence 5' - 3'/SEQ ID NO: | Purpose |
|---|---|---|
| CCK Fwd | TCTGAAGCTCTCCTTGAGGC/1 | PCR |
| CCK Rev- | GACAGTGAGAGCTTTTCTGC/2 | |
| Cdx1b Fwd | GGCTTCAGTCCTCCACTAGTT/3 | PCR |
| Cdx1b Rev | GGCGGTTCTGGAACCAGA/4 | |
| 18S Fwd | TCGATGGTACTTTCTGTGCC/5 | PCR |
| 18S Rev | TGGATGTGGTAGCCGTTTCT/6 | |
| PepT1 Fwd | AGATGCAGTGCTACCCTCTG/7 | Real-time |
| PepT1 Rev | TGTACATACCGCTTCCAACG/8 | PCR |
| PCNA Fwd | CTCGCCCTTGTGTTTGAGAC/9 | Real-time |
| PCNA Rev | CTCGCCCTTGTGTTTGAGAC/10 | PCR |
| Cdx1b Fwd | GTTCACCGGGCAGTCATCT/11 | Real-time |
| Cdx1b Rev | CAGTCGTACGGGTTCCTCC/12 | PCR |

TABLE 6-continued

Sequences of the primers used for PCR and real-time PCR.

| Primer | Sequence 5' - 3'/SEQ ID NO: | Purpose |
|---|---|---|
| CCK Fwd | CAGACAGGGACTACTTGGGG/13 | Real-time PCR |
| CCK Rev | AGTACTCGTACTCCTCTGCG/14 | |
| β-actin Fwd | AGAAGAGCTATGAGCTGCCC/15 | Real-time PCR |
| β-actin Rev | GGACTCCATACCGAGGAA GG/16 | |

Histological Analysis of Proximal Intestine Cross Sections (C.S.)

Standard protocol for histological analysis was implemented (Grate et al., 2003). Briefly, intestinal samples were dehydrated as follows: (1) transferred to 30% ethanol for 2 hours, then (2) in 50% ethanol for 2 hours and then (3) in 70% ethanol overnight. The following day the samples (4) were transferred to 95% ethanol for 3 hours (twice), then in (5) 100% ethanol for 1 hour (twice) and then stored. Samples were cleared in K-Clear (Kaltek, Italy) before being embedded in Paraplast (Sigma Aldrich, USA) and cross sectioned at a thickness of 5 μm (RM2245 microtome, Leica, Germany). Sections were placed on slides (3 sections on each slide and one slide per sample) and stained with hematoxylin-eosin (HE) that stained cell nuclei and cell structures within the intestinal tissue. Intestinal cross sections were photographed under a stereo zoom microscope (Axio Zoom.V16, Zeiss, Germany) and the inner and outer perimeter (mm) of the sections were measured using ImageJ software (imagej(dot)nih(dot)gov/ij/). For each section the inner perimeter (mm) of the intestine with the crypts and villi was normalized against the outer perimeter (mm). The calculated ratio (inner perimeter/outer perimeter) for each section was then averaged for each slide/sample and analyzed for differences between treatments.

Proximate Analysis (Biochemical Analysis)

Crude protein was determined using the Kjeldahl method and multiplying N by 6.25. Total lipid was measured after being extracted with chloroform-methanol (Folch et al., 1957). Using a high speed homogenizer (T-25, IKA, Germany) samples were homogenized for 5 min and total lipid was determined gravimetrically after solvent separation and drying by vacuum. Ash was quantified by weighing after incineration of samples for 24 hours at 550° C. in a muffle furnace. Gross energy (GE) was calculated by combustion in a bomb calorimeter (Parr, USA) using benzoic acid as a standard.

Statistical Analysis

Differences between dietary treatments were evaluated with parametric data analysis followed by Levene's test for homogeneity of variances. The effects of 0.8% dietary butyrate and a control diet or 1.6% dietary butyrate on gene expression were analyzed by student t-test whereas data from trials which had 3 or 4 dietary treatments was analyzed using one-way ANOVA (STATISTICA v10; StatSoft, Ltd., Tulsa, OK, USA) followed by post-hoc Tukey HSD. Results of gene expression, histological cross sections analysis as well as gut index were log transformed prior to their analysis with ANOVA. Survival and all proportion or percentage values were first arcsine transformed.

EXAMPLE 1

Taurine and Butyrate Exhibit Synergetic Effect on Growth Performance

Addition of taurine and butyrate to white groupers diet (+TB) resulted in significantly ($P<0.05$) higher relative weight gain (RWG) which was (203.59±10.18%) compared to (152.67±5.62%) of weight gained by the control fish in addition to significantly ($P<0.05$) higher final weight of (125.12±1.61 gr) compared to fish fed the control diet (104.59±1.70 gr) (Table 7). Fish fed the (+TB) diet also exhibited significantly ($P<0.05$) higher specific growth rate (SGR) which was (1.22±0.04%) compared to fish fed the control diet (1.02±0.02%) and an average weight gain that was significantly ($P<0.01$) higher than all other treatment groups (Table 7). Feed conversion ratio (FCR) significantly ($P<0.05$) improved from (2.82±0.12) in fish fed the control diet to (2.32±0.07) with the addition of taurine and butyrate to the diet (+TB) (Table 7).

TABLE 7

Growth, survival (%), RWG (%), SGR and FCR of juvenile white grouper fed with the experimental diets. Results are presented as mean of 4 replicates ± SEM and different letters represent significantly different values.

| Parameter | Control | +T | +B | +TB | Significance |
|---|---|---|---|---|---|
| Survival (%) | 94.83 ± 2.23 | 89.47 ± 4.38 | 93.10 ± 2.44 | 90.52 ± 2.94 | NS |
| Initial weight (g) | 41.53 ± 2.04 | 41.90 ± 1.62 | 41.91 ± 2.07 | 41.41 ± 2.09 | NS |
| Final weight (g) | 104.59 ± 1.70$^a$ | 111.77 ± 5.89$^{ab}$ | 112.25 ± 2.53$^{ab}$ | 125.12 ± 1.61$^b$ | At $P < 0.05$ |
| Average weight gain (g) | 63.06 ± 1.05$^a$ | 69.10 ± 6.22$^a$ | 69.17 ± 2.43$^a$ | 83.71 ± 1.50$^b$ | At $P < 0.01$ |
| RWG (%) | 152.67 ± 5.62$^a$ | 163.20 ± 18.60$^{ab}$ | 161.19 ± 6.94$^{ab}$ | 203.59 ± 10.18$^b$ | At $P < 0.05$ |
| SGR | 1.02 ± 0.02$^a$ | 1.06 ± 0.08$^{ab}$ | 1.05 ± 0.03$^{ab}$ | 1.22 ± 0.04$^b$ | At $P < 0.05$ |
| FCR | 2.82 ± 0.12$^a$ | 2.71 ± 0.10$^{ab}$ | 2.62 ± 0.06$^{ab}$ | 2.32 ± 0.07$^b$ | At $P < 0.05$ |

RWG: relative weight gain = (weight gain/initial weight) × 100.
SGR: specific growth rate = 100 × ln(final weight/initial weight)/days of trial.
FCR: feed conversion ratio = feed offered (g)/weight gain (g)

EXAMPLE 2

Butyrate Partially Restores Taurine Induced Negative Modulation of TauT Expression TauT expression levels in the proximal intestine were measured and compared for diets containing the addition of 1.5% DW taurine (+T); 0.1% DW butyrate (+B); 1.5% DW taurine and 0.1% DW butyrate (+TB); or the control, non-supplemented diet which contained only background taurine from fish and poultry meal components in the base diet (control). Taurine addition to the diet negatively modulated Tata expression in the proximal intestine of white groupers and reduced TauT levels of expression significantly ($P<0.05$) as compared between diets (control) and (+T) and as compared between diets (+B) and (+TB) (FIG. 1). In the presence of 1.5% DW taurine in the diet, the addition of butyrate (+TB) partially restores TauT expression levels as compared to the control and (+T) diets (FIG. 1).

EXAMPLE 3

Butyrate Elevates Taurine Levels in Muscles

Figure 2A:
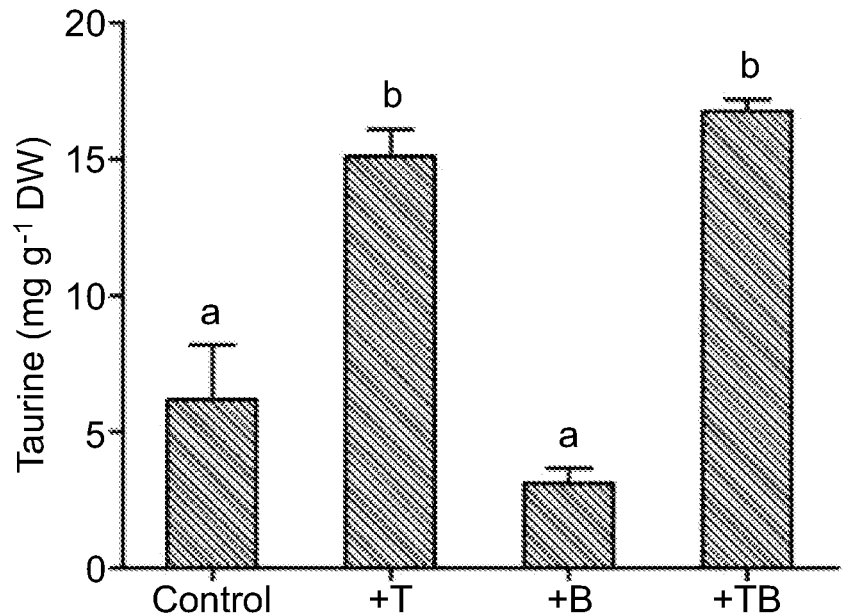
FIGS. 2A-B are graphs showing the effect of butyrate or taurine or both on liver or muscle taurine content (mg $g^{-1}$ DW) in juvenile groupers fed with experimental diets containing 0 or 0.1% sodium butyrate and 0 or 1.5% taurine. Mean values of columns having different letters were significantly ($P<0.05$) different.
Figure 2B:
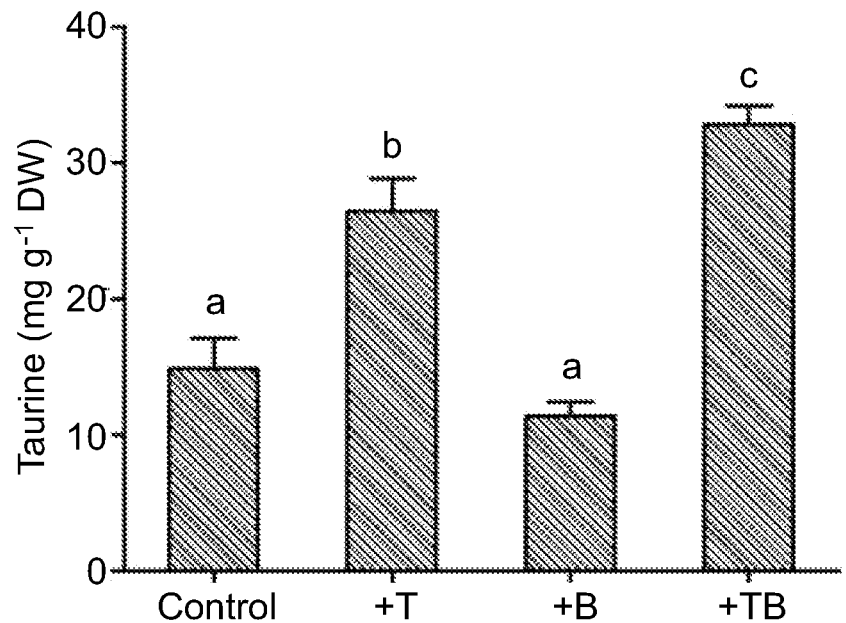

Taurine accumulation in liver and muscle tissues of fish fed the different diets was analyzed. Considerably ($P<0.001$) higher taurine levels (mg g-1 DW) in the liver (FIG. 2A) and muscle (FIG. 2B) of fish fed with taurine supplemented diets (+T and +TB) were found. Moreover, while feeding a taurine containing diet (+T) resulted in increased muscle taurine levels, the addition of butyrate to that diet (+TB) significantly ($P<0.05$) elevated those levels by another 24% (FIG. 2B).

EXAMPLE 4

Butyrate Affects Intestine Morphology

Figure 3:
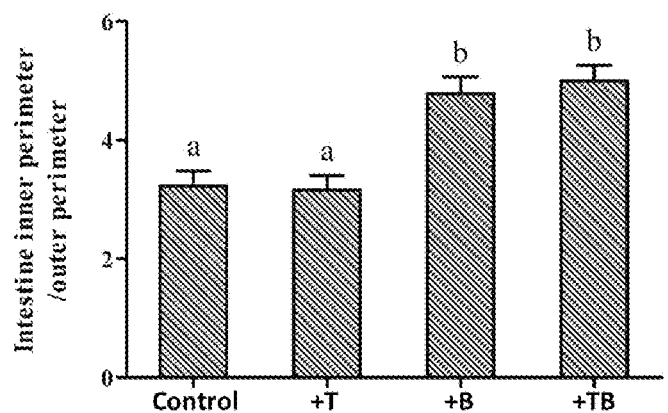
FIG. 3 is a graph showing the effect of butyrate or taurine or both on proximal intestine morphology as represented by the ratio of inner to outer perimeter (mm) measured in intestine cross sections sampled from juvenile groupers fed experimental diets containing 0 or 0.1% sodium butyrate and 0 or 1.5% taurine. Mean values of columns having different letters were significantly ($P<0.05$) different.

Butyrate supplementation to the diet (+B and +TB diets) exhibited a positive effect on the luminal morphology of the proximal intestine when significantly ($P<0.01$) extended its perimeter by more than 48% as was measured in histological cross sections taken from the proximal intestine (FIG. 3).

EXAMPLE 5

PepT1 Pattern of Expression and Effect of Sodium Butyrate Thereon

The PepT1 pattern of expression in the sea bream was higher prior to the morning feeding, which was consistently given at the same time throughout the trial, and then decreased. On the other hand, there was no marked elevation in Pept1 expression preceding the second daily feeding.

Figure 4:
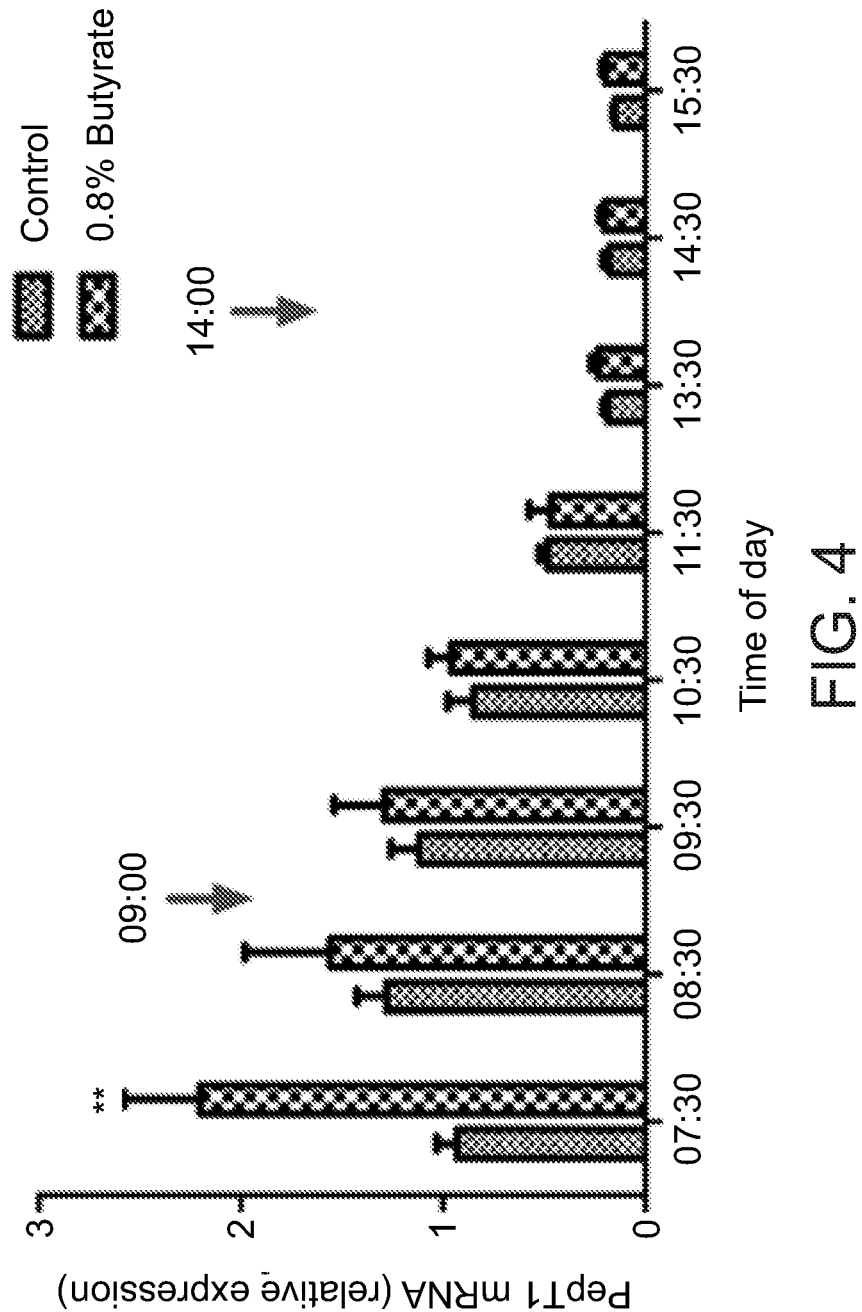
FIG. 4 is a graph showing the effect of butyrate on PepT1 mRNA expression in gilthead sea bream during the day. PepT1 mRNA relative expression of sea bream (n=6) fed with a control diet and a diet containing 0.8% of sodium butyrate at several time points during the day from 07:30 in the morning to 15:30 in the afternoon. Red arrows indicate the time of feeding. For each time point asterisks above column indicate a significant (P<0.01; t-test) difference between the two treatments.

In order to investigate if dietary butyrate can up-regulate PepT1 expression in the sea bream, fish were fed the same diet as in the previous trial with or without (control) the addition of 0.8% sodium butyrate. A similar pattern of expression was found in both treatments where Pept1 expression increased toward the morning feeding and then decreased. However, fish fed the sodium butyrate supplemented diet demonstrated a significantly ($P<0.01$) higher PepT1 expression compared to PepT1 expression in the control fish prior to the morning feeding (FIG. 4). Interestingly this was recorded more than 17 hours after the previous day's afternoon feeding which included butyrate supplementation.

Figure 5A:
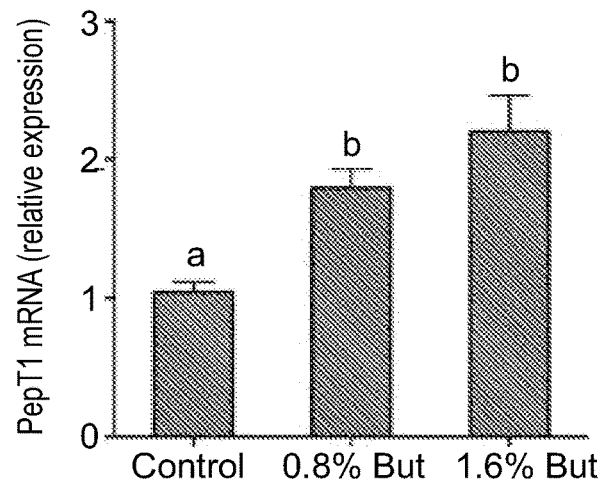
FIGS. 5A-C are graphs showing a sustained effect of butyrate on PepT1 mRNA expression in gilthead sea bream.
Figure 5B:
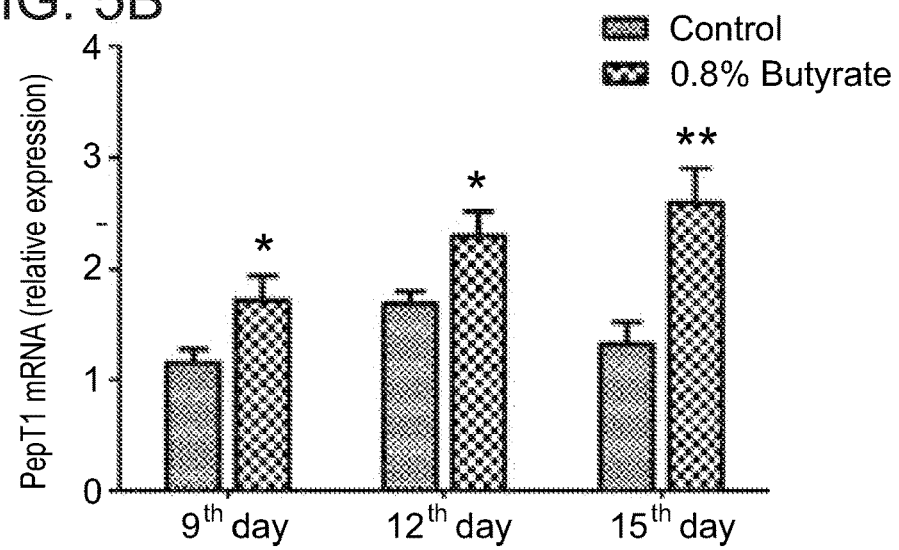
Figure 5C:
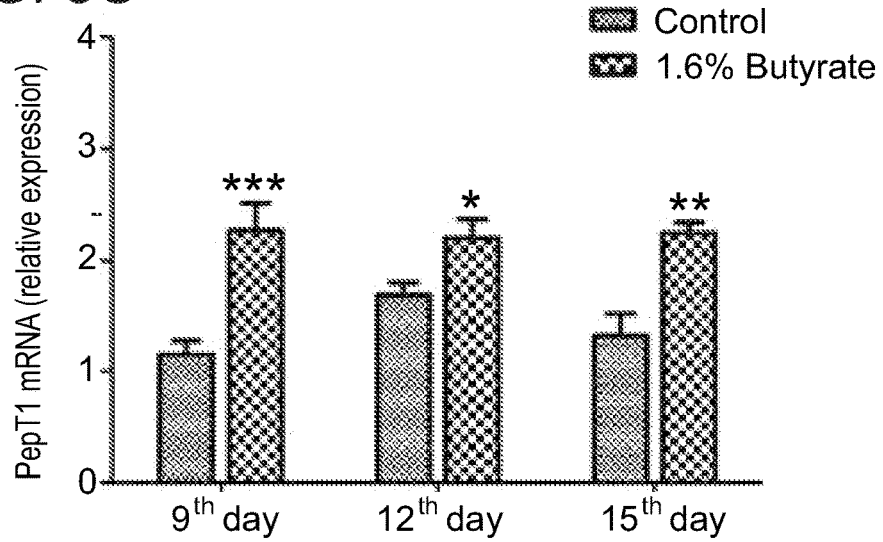

To measure the sustained effect of butyrate on PepT1 mRNA transcription levels when dietary supplementation of this short chain fatty acid has stopped, the fish were fed elevated butyrate levels of 0 (control), 0.8 and 1.6% of dry weight diet for 8 days followed by feeding only the control diet for a further 6 days. The 0.8 and 1.6% supplementation of butyrate significantly ($P<0.001$) increased PepT1 transcription, which was more than 2 fold in the 1.6% butyrate treatment (FIG. 5A). PepT1 transcription levels in fish fed 0.8% (FIG. 5B) and 1.6% (FIG. 5C) butyrate remained higher than the control 6 days after feeding butyrate treatments had ceased.

EXAMPLE 6

Butyrate Effect on Intestinal Epithelial Cell Proliferation

Figure 6:
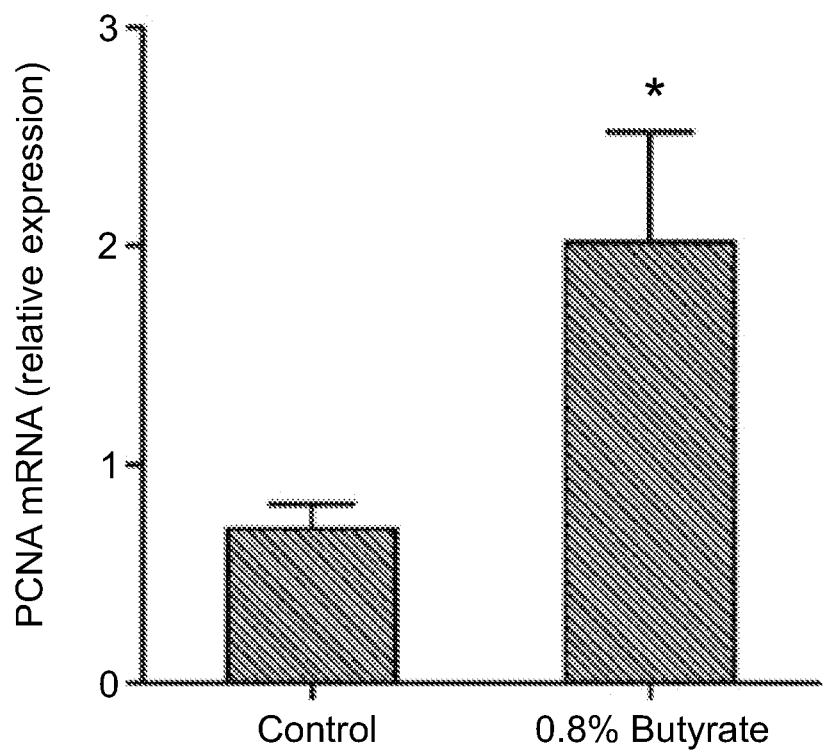
FIG. 6 is a graph showing Butyrate effect on Proliferating Cell Nuclear Antigen (PCNA) mRNA expression. PCNA mRNA relative expression in sea bream (n=6) fed with a control diet and a diet containing 0.8% of butyrate measured 1.5 h after feeding. Asterisks above column indicate a significant (P<0.05; t-test) difference between the two treatments.

In order to determine PCNA levels (as a marker for proliferating cells) in fish that were fed with diets containing 0% (control) and 0.8% sodium butyrate for 9 days, total RNA was extracted 1.5 h after feeding from samples of the proximal intestine. A significant ($P<0.05$) effect of dietary butyrate on the transcription of PCNA was demonstrated. The PCNA expression in the butyrate treatment was more than 2-fold of that of the control (FIG. 6).

EXAMPLE 7

Butyrate Effect on Fish Fed a Low Protein Diet

The results above demonstrated that the addition of sodium butyrate to the sea bream diet increased PepT1 transcription levels and possibly promoted proliferation of intestinal cells as suggested by the stimulatory effect on PCNA transcription levels. To take this one step further, it was attempted to elucidate whether the butyrate-induced transcriptional effects on the intestine can, as well, facilitate protein uptake and improve growth. This potentially enhanced protein absorption would also reduce the level of dietary protein necessary to achieve optimal growth, resulting in lower feed costs and nitrogen effluent during growout.

Figure 8:
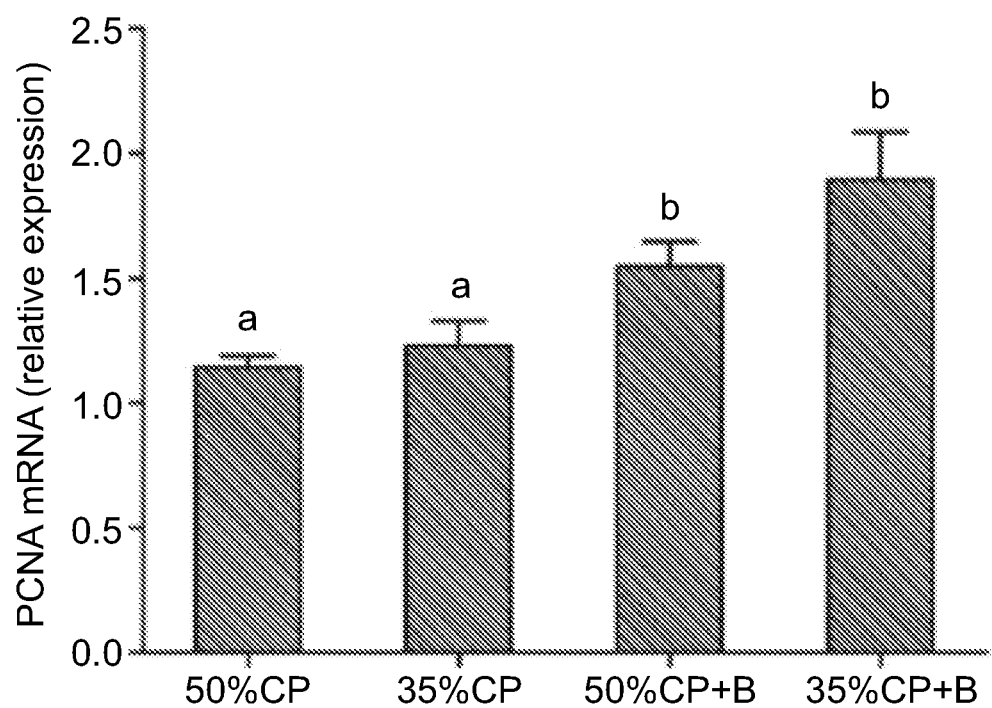
FIG. 8 is a graph showing PCNA mRNA expression at different protein levels with 1% taurine and with or without butyrate. PCNA relative expression of fish (n=15) fed with the experimental diets. Values having different letters were significantly different (P<0.05).

Protein levels and/or the supplementation of butyrate had no apparent effect on fish survival but had a significant ($P<0.05$) effect on the average weight gain between diets (Table 8). While sea bream fed the 35% crude protein (CP) diet exhibited significantly ($P<0.05$) lower average weight gain (27.32 g fish$^-$) than the 50% CP fish (29.48 g fish$^{-1}$), supplementing the diets with 1.6% of butyrate markedly ($P<0.05$) improved growth in these dietary treatments (28.83 and 31.15, respectively; Table 8). In terms of percent (%) weight gain (RWG), significantly ($P<0.01$) lower values were also displayed by fish fed the 35% CP (493.3%) compared to the 50% CP fish (524.6%). On the other hand, adding butyrate to the 50% CP diet resulted in a RWG (556.99%) that was significantly ($P<0.01$) better than all treatments. The addition of butyrate to the 35% CP diet also significantly ($P<0.01$) increased the fish RWG (520.46%), which was not significantly ($P>0.05$) different than the one exhibited by 50% CP fed fish in the absence of dietary butyrate (Table 8). This pattern was also similarly reflected and significant in the specific growth rate (SGR) and feed conversion ratio (FCR) ($P<0.001$ and $P<0.01$, respectively; Table 8). Interestingly, supplementing butyrate to the 35% CP diet resulted in fish having the highest protein efficiency ratio (PER; 2.31; Table 8) of all treatments tested. In Table 8, fish fed the 35% CP+B treatment also significantly (P<0.001) prevailed (127.44%) when measuring the protein productive value (PPV). Furthermore, proximate analysis results did not indicate any significant effect of the butyrate supplementation on the fish whole body proximate composition (Table 9).

used to determine PCNA (as a marker for proliferating cells) transcription levels. PCNA transcription levels were significantly (P<0.05) higher in fish receiving butyrate supplementation (35% CP+B and 50% CP+B) regardless of the protein inclusion in their diet (FIG. 8)

TABLE 8

Growth parameters at different protein levels with taurine and with or without butyrate. Growth, survival (%), RWG (%), SGR and FCR, PER, PPV (%) of juvenile gilthead sea bream fed with the experimental diets. Results are presented as mean of 5 replicates ± SEM and different letters represent significantly different values.

| Parameter | 50% CP | 35% CP | 50% CP + B | 35% CP + B | Significance |
|---|---|---|---|---|---|
| Survival (%) | 93.33 ± 2.79 | 97.33 ± 1.25 | 95.33 ± 1.33 | 94.00 ± 1.25 | NS |
| Initial weight (g) | 5.62 ± 0.04 | 5.54 ± 0.07 | 5.59 ± 0.03 | 5.54 ± 0.02 | NS |
| Final weight (g) | 35.10 ± 0.12$^a$ | 32.86 ± 0.22$^b$ | 36.74 ± 0.18$^c$ | 34.37 ± 0.15$^d$ | At P < 0.05 |
| Average weight gain (g) | 29.48 ± 0.11$^a$ | 27.32 ± 0.16$^b$ | 31.15 ± 0.17$^c$ | 28.83 ± 0.16$^d$ | At P < 0.05 |
| $^1$ RWG (%) | 524.64 ± 3.73$^a$ | 493.31 ± 4.75$^b$ | 556.99 ± 3.97$^c$ | 520.46 ± 4.32$^a$ | At P < 0.01 |
| $^2$ SGR | 1.99 ± 0.01$^a$ | 1.94± 0.01$^b$ | 2.05 ± 0.01$^c$ | 1.98 ± 0.01$^a$ | At P < 0.001 |
| $^3$ FCR | 1.18 ± 0.01$^a$ | 1.23 ± 0.01$^b$ | 1.13 ± 0.02$^c$ | 1.18 ± 0.01$^a$ | At P < 0.01 |
| $^4$ PER | 1.73 ± 0.01$^a$ | 2.21 ± 0.01$^b$ | 1.81 ± 0.01$^c$ | 2.31 ± 0.02$^d$ | At P < 0.001 |
| $^5$ PPV (%) | 38.51 ± 0.96$^a$ | 58.84 ± 1.6$^b$ | 43.83 ± 1.24$^c$ | 64.65 ± 2.18$^d$ | At P < 0.001 |

$^1$ RWG: relative weight gain = (weight gain/initial weight) × 100.
$^2$ SGR: specific growth rate = 100 × ln(final weight/initial weight)/days of trial.
$^3$ FCR: feed conversion ratio = feed offered (g)/weight gain (g).
$^4$ PER: protein efficiency ratio = weight gain (g)/protein intake (g).
$^5$ PPV: protein productive value = fish protein gain (g) × 100/protein intake (g).

TABLE 9

Protein, lipid and energy content of whole fish at different protein levels including taurine with or without butyrate. Whole body proximate analysis for dry weight (%), protein level (% dry weight), lipid (% dry weight) and energy (cal g$^{-1}$) of juvenile gilthead sea bream fed with the experimental diets. Results are presented as mean of 10 fish ± SEM and different letters represent significantly different values.

| | 50% CP | 35% CP | 50% CP + Butyrate | 35% CP + Butyrate | Significance |
|---|---|---|---|---|---|
| Dry weight (%) | 29.72 ± 0.34 | 30.96 ± 0.21 | 30.01 ± 0.26 | 30.51 ± 0.45 | NS |
| Protein | 58.69 ± 0.56$^a$ | 54.98 ± 0.75$^b$ | 58.2.5 ± 0.74$^a$ | 55.07 ± 0.86$^b$ | At P < 0.01 |
| Lipid | 24.34 ± 0.87$^a$ | 29.73 ± 0.73$^b$ | 25.82 ± 0.71$^a$ | 29.11 ± 0.85$^b$ | At P < 0.01 |
| Ash | 14.34 ± 0.24 | 13.71 ± 0.21 | 13.86 ± 0.16 | 14.16 ± 0.42 | NS |
| Energy (cal g$^{-1}$) | 5639 ± 42.28 | 5801.89 ± 46.17 | 5651.9 ± 45.29 | 5659.8 ± 85.54 | NS |

EXAMPLE 8

Figure 7:
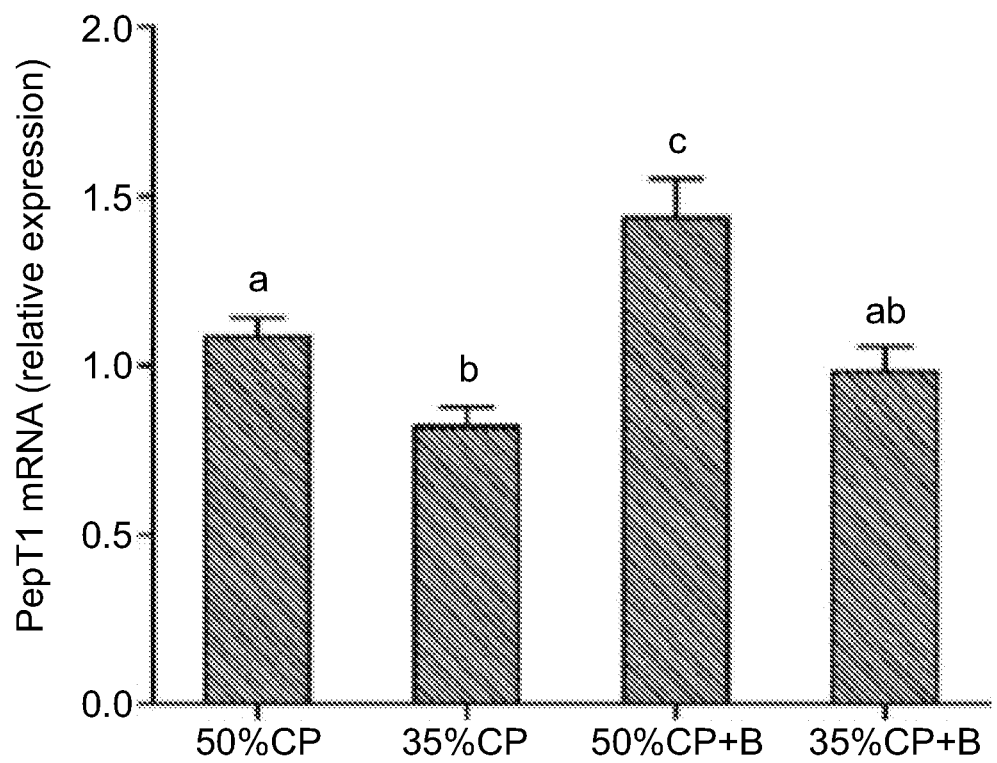
FIG. 7 is a graph showing PepT1 mRNA expression at different protein levels in the feed with or without butyrate. PepT1 relative expression of sea bream (n=15) fed with the experimental diets of 50% and 35% crude protein with 1% taurine and with or without the addition of butyrate (assigned as 50% CP, 35% CP, 50% CP+B and 35% CP+B respectively). Different letters represent significantly (at least P<0.01) different values. $F_{3,40}$=7.07, P<0.01; Nested-design ANOVA.

Regulation of PepT1 mRNA Transcription by Different Levels of Dietary Protein and Butyrate Supplementation PepT1 transcription levels were significantly (P<0.001) lower in the 35% CP fish than in fish fed the 50% CP diet (FIG. 7). However, fish receiving the 50% CP diet with 1.6% of sodium butyrate (50% CP+B) exhibited the highest PepT1 expression levels (P<0.01). Nevertheless, butyrate supplementation to the low CP diet resulted in non-significant (P>0.05) difference in Pept1 expression when compared to the high CP diet.

EXAMPLE 9

The Effect of Dietary Butyrate Supplementation and the Level of Dietary Protein on Intestinal Cell Proliferation Total RNA that was extracted from proximal intestine samples of fish that were fed with the different diets was

EXAMPLE 10

Figure 9:
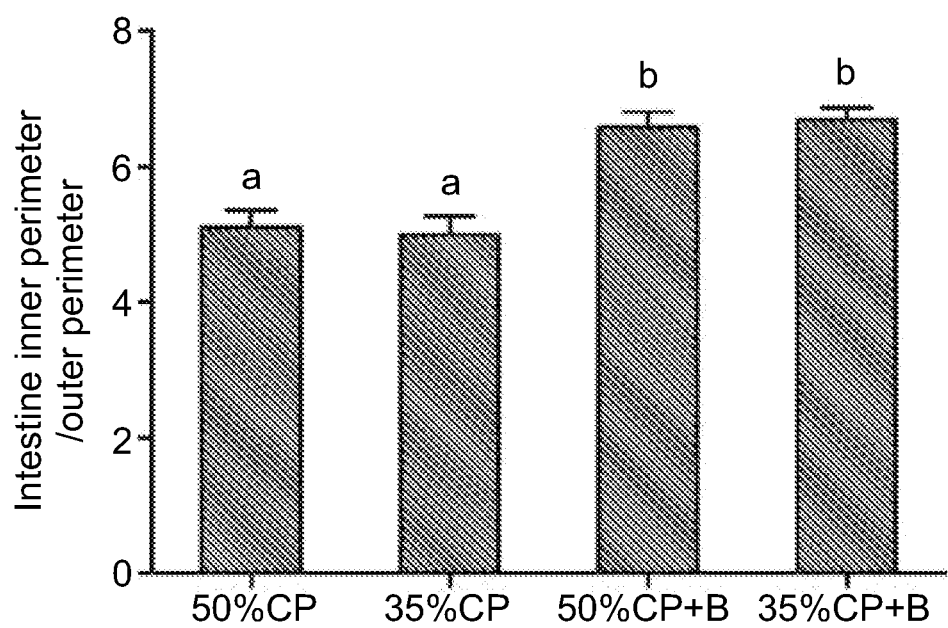
FIG. 9 is a graph showing the ratio between the intestine inner and outer perimeter of juvenile sea bream (n=10) fed with the experimental diets. Values having different letters were significantly (P<0.001) different. $F_{3,36}$=14.74, P<0.0001; one-way ANOVA.

The Effect of Dietary Butyrate Supplementation and the Level of Dietary Protein on the Intestinal Morphology In order to examine a physiological effect of dietary butyrate on the intestinal epithelial morphology, histological cross sections of proximal intestine samples of fish that were fed with the different diets were analyzed. The inner perimeter (mm) of the intestine was measured using ImageJ and normalized against measurements of the outer perimeter. The addition of butyrate demonstrated a positive effect on the proximal intestine epithelium through markedly (P<0.001) expanding its inner to outer perimeter ratio by approximately 30%. This effect was independent of the level of dietary protein (FIG. 9).

Figure 10:
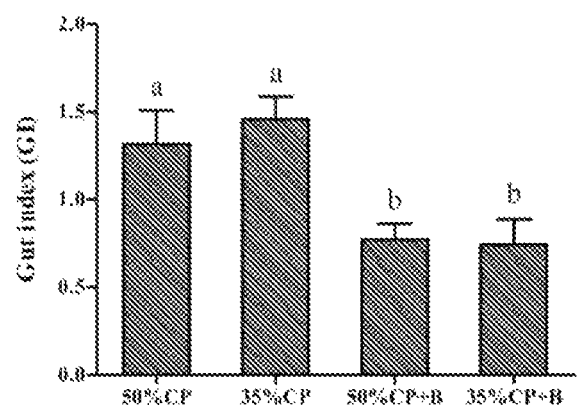
FIG. 10 is a graph showing Gut index (Gut index=100× body weight (g)/[intestine length (mm)]3) at different protein levels with or without butyrate. Gut index of juvenile sea bream (n=25) fed with the experimental diets. Bars having different letters indicate a significant (P<0,05) difference. F3, 80=5.108, P<0.01; Nested-design ANOVA.

Furthermore, a gut index which represents the body weight (g) in relation to the length of the intestinal tract (mm) was calculated for fish from the different dietary treatment groups. Supplementing the fish diet with butyrate at both dietary protein levels of 35 and 50% resulted in elongation of their intestine length with respect to their body mass which is expressed as a significantly (P<0.01) lower gut index in the 35% CP+B and 50% CP+B diets as compared to the same diets in the absence of dietary butyrate (FIG. 10).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

Other References are Listed Throughout the Application

1. Bartholome, A. L., Albin, D. M., Baker, D. H., Holst, J. J., Tappenden, K. a, 2004. Supplementation of total parenteral nutrition with butyrate acutely increases structural aspects of intestinal adaptation after an 80% jejunoileal resection in neonatal piglets. JPEN. J. Parenter. Enteral Nutr. 28, 210-222; discussion 222-223.

2. Clausen, M. R., Mortensen, P. B., 1994. Kinetic studies on the metabolism of short-chain fatty acids and glucose by isolated rat colonocytes. Gastroenterology 106, 423-432. doi:S001650859400051X [pii].

3. Cook, S. I., Sellin, J. H., 1998, Review article: short chain fatty acids in health and disease. Aliment. Pharmacol. Ther. 12, 499-507.

4. Cummings, J. H., 1981. Short chain fatty acids in the human colon. Gut 22, 763-779. doi:10.1136/gut.22.9.763.

5. Dalmasso, G., Nguyen, H. T. T., Yan, Y., Charrier-Hisamuddin, L., Sitaraman, S. V, Merlin, D., 2008. Butyrate transcriptionally enhances peptide transporter PepT1 expression and activity. PLoS One 3, e2476. doi:10.1371/journal.pone.0002476.

6. Daniel, H., 2004. Molecular and integrative physiology of intestinal peptide transport. Annu. Rev. Physiol. 66, 361-384. doi:10.1146/annurev.physiol.66.032102.144149.

7. Guilloteau, P., Zabielski, R., David, J. C., Blum, J. W., Morisset, J. A., Biernat, M., Wolinski, J., Laubitz, D., Hamon, Y., 2009. Sodium-butyrate as a growth promoter in milk replacer formula for young calves. J. Dairy Sci. 92, 1038-49. doi:10.31.68/jds.2008-1213.

8. Kotunia, a., Woliński, J., Laubitz, D., Jurkowska, M., Romé, V., Guilloteau, P., Zabielski, R., 2004. Effect of sodium butyrate on the small intestine development in neonatal piglets fed [correction of feed] by artificial sow. J. Physiol. Pharmacol. 55 Suppl 2, 59-68.

9. Lall S, Dumas A. Chapter 3: Nutritional requirements of cultured fish: formulating nutritionally adequate feeds. In: Allen Davis D, editor. Feed and Feeding Practises in Aquaculture. UK: Woodhead Publishing; 2015. p. 53-109.

10. Lambert I H, Kristensen D M, Holm J B, Mortensen O H (2015) Physiological role of taurine □ from aquatic animal to organelle. Acta Physiol (Oxf) 213: 191-212.

11, Lu, J. J., Zou, X. T., Wang, Y. M., 2008. Effects of sodium butyrate on the growth performance, intestinal microflora and morphology of weanling pigs. J. Anim. Feed Sci. 17, 568-578.

12. Mariadason, J. M., Kilias, D., Catto-Smith, A., Gibson, P. R., 1999. Effect of butyrate on paracellular permeability in rat distal colonic mucosa ex vivo. J. Gastroenterol. Hepatol. 14, 873-879. doi:10.1046/j.1440-1746.1999.01972.x.

13. McIntyre, a, Gibson, P. R., Young, G. P., 1993. Butyrate production from dietary fibre and protection against large bowel cancer in a rat model. Gut 34, 386-391. doi:10.1136/gut.34.3.386.

14. Partanen, K. H., Mroz, Z., 1999. Organic acids for performance enhancement in pig diets. Nutr. Res. Rev. 12, 117-145. doi:10.1079/095442299108728884.

15. Roediger W E, M.S., 1996. Colonocyte metabolism. Gut 38, 792-793.

16. Sakata, T., 1987. Stimulatory effect of short-chain fatty acids on epithelial cell proliferation in the rat intestine: a possible explanation for trophic effects of fermentable fibre, gut microbes and luminal trophic factors. Br. J. Nutr. 58, 95-103. doi:10.1079/BJN19870073.

17. Sengupta, S., Muir, J. G., Gibson, P. R., 2006. Does butyrate protect from colorectal cancer? J. Gastroenterol. Hepatol. 21, 209-218. doi:10.1111/j.1440-1746.2006.04213.x.

18. The State of World Fisheries and Aquaculture 2016. Contributing to food security and nutrition for all. Rome.

What is claimed is:

1. A method of feeding an aquaculture of an aquatic animal species of interest, the method comprising providing the aquaculture with an aquaculture feed comprising an amount of protein at least 30% by weight lower than that optimal for the species at a predetermined developmental stage and an effective amount of butyric acid ester thereof or salt thereof, and taurine, ester thereof or salt thereof said effective amount facilitating reducing feed conversion ratio (FCR).

2. A method of increasing relative weight gain (RWG), specific growth rate (SGR) and reducing feed conversion ratio (FCR) of an aquaculture of an aquatic animal species of interest, the method comprising providing the aquaculture with an aquaculture feed comprising an amount of protein at least 30% by weight lower than that optimal for the species at a predetermined developmental stage and an effective amount of butyric acid ester thereof or salt thereof and taurine, ester thereof or salt thereof, said effective amount facilitating in increasing RWG, SGR and reducing FCR.

3. A method of improving feed and protein utilization of an aquaculture of an aquatic animal species of interest, the method comprising providing the aquaculture with an aquaculture feed comprising an amount of protein at least 30% by weight lower than that optimal for the species at a predetermined developmental stage and an effective amount of butyric acid, ester thereof or salt thereof, and taurine, ester thereof or salt thereof said effective amount facilitating reducing feed conversion ratio (FCR).

4. The method of claim 1, wherein said aquatic animal species of interest comprises fish.

5. The method of claim 1, wherein said aquatic animal species comprises a plurality of individuals of fish species of interest at said predetermined developmental stage.

6. The method of claim 1, wherein said effective amount of taurine, ester thereof or salt thereof comprises 0.1-5% by weight.

7. The method of claim 1, wherein said effective amount of taurine, ester thereof or salt thereof comprises 1-1.5% by weight.

8. The method of claim 1, wherein said feed further comprises nutritional ingredients selected from the group consisting of fat, carbohydrate, vitamins and minerals.

9. The method of claim 1, wherein said effective amount comprises 0.1-1.6% by weight butyric acid or salt thereof.

10. The method of claim 1, wherein said protein comprises a fish protein, a poultry protein or a combination of same.

11. The method of claim 1, wherein said feed is formulated as a pellet.

12. The method of claim 11, wherein said feed is agglomerated, granulated, pressed or extruded type.

13. The method of claim 4, wherein said fish is a marine fish.

14. The method of claim 4, wherein said fish is a carnivore fish.

15. The method of claim 4, wherein said fish is selected from the group of Fish listed in Table 2.

16. The method of claim 4, wherein said fish is in at least a juvenile developmental stage.

17. The method of claim 4, wherein a majority of said fish in said aquaculture are at least 3 gr.

18. The method of claim 1, wherein the feed comprises a minimum of 5% total lipids and/or 5-50% carbohydrates.

19. The method of claim 1, wherein said providing is effected not more than once in 24 hours.

20. The method of claim 1, wherein said providing is effected once a week.

21. The method of claim 1, wherein said providing is effected once two weeks.

22. The method of claim 1, wherein said providing is effected once three weeks.

23. The method of claim 1, wherein said providing is effected every 1-3 weeks.

24. The method of claim 1, wherein said providing is effected every 2-3 weeks.

25. The method of claim 1, wherein said effective amount comprises 0.1-1.6% by weight butyric acid, ester thereof or salt thereof and said effective amount of taurine, ester thereof or salt thereof comprises 1-1.5% by weight.

* * * * *